US010754429B2

(12) United States Patent
Mani

(10) Patent No.: US 10,754,429 B2
(45) Date of Patent: *Aug. 25, 2020

(54) HAPTIC FEEDBACK DEVICE AND METHOD FOR PROVIDING HAPTIC SENSATION BASED ON VIDEO

(71) Applicant: Alex Hamid Mani, LaJolla, CA (US)

(72) Inventor: Alex Hamid Mani, LaJolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/600,636

(22) Filed: Oct. 14, 2019

(65) Prior Publication Data

US 2020/0042092 A1 Feb. 6, 2020

Related U.S. Application Data

(63) Continuation of application No. 16/298,016, filed on Mar. 11, 2019, now Pat. No. 10,496,176, which is a continuation of application No. 15/709,985, filed on Sep. 20, 2017, now Pat. No. 10,281,983.

(51) Int. Cl.

| G06F 3/01 | (2006.01) |
|---|---|
| H04N 5/14 | (2006.01) |
| H04N 5/44 | (2011.01) |
| A63F 13/285 | (2014.01) |
| G09B 21/00 | (2006.01) |

(52) U.S. Cl.
CPC ............ G06F 3/016 (2013.01); A63F 13/285 (2014.09); G09B 21/00 (2013.01); G09B 21/003 (2013.01); H04N 5/4403 (2013.01); H04N 5/144 (2013.01)

(58) Field of Classification Search
CPC ....... G06F 3/016; A63F 13/285; G09G 21/00; G09G 21/003; H04N 5/4403; H04N 5/144

See application file for complete search history.

(56) References Cited

U.S. PATENT DOCUMENTS

| 6,509,892 B1 | 1/2003 | Cooper et al. |
|---|---|---|
| 6,650,338 B1 | 11/2003 | Kolarov et al. |
| 7,855,657 B2 | 12/2010 | Doemens et al. |
| 8,410,916 B1 | 4/2013 | Gladson et al. |
| 8,526,677 B1 | 9/2013 | Crichton et al. |
| 8,754,757 B1 | 6/2014 | Ullrich et al. |

(Continued)

OTHER PUBLICATIONS

Advisory Action for U.S. Appl. No. 16/297,960 dated Dec. 5, 2019.

(Continued)

Primary Examiner — Ricardo Osorio
(74) Attorney, Agent, or Firm — Chip Law Group

(57) ABSTRACT

A haptic feedback device for providing haptic sensation comprises a haptic feedback interface that includes a plurality of haptic elements. The haptic feedback device detects a plurality of different motion associated with a plurality of objects in an upcoming scene of a video based on a look-ahead buffer of the video played on an external display device or the haptic feedback device. A haptic feedback is determined for the upcoming scene of the video based on the look-ahead buffer of the video and the detected plurality of different motion associated with the plurality of objects. One or more movable haptic cues are generated on the haptic feedback interface using the plurality of haptic elements in synchronization with a current scene played on the external display device or the haptic feedback device, based on the determined haptic feedback.

20 Claims, 9 Drawing Sheets

(56) References Cited

U.S. PATENT DOCUMENTS

| | | |
|---|---|---|
| 9,147,328 B2 | 9/2015 | Ioffreda et al. |
| 9,417,754 B2 | 8/2016 | Smith |
| 9,635,440 B2 | 4/2017 | Lacroix |
| 9,919,208 B2 | 3/2018 | Rihn et al. |
| 9,928,701 B2 | 3/2018 | Levesque et al. |
| 9,946,346 B2 | 4/2018 | Kawamura et al. |
| 10,251,788 B1 | 4/2019 | Phan |
| 10,281,983 B2 | 5/2019 | Mani |
| 10,296,093 B1 | 5/2019 | Christensen et al. |
| 10,503,310 B2 | 12/2019 | Mani et al. |
| 2002/0084996 A1 | 7/2002 | Temkin et al. |
| 2003/0063776 A1 | 4/2003 | Sato |
| 2006/0038781 A1 | 2/2006 | Levin |
| 2011/0287393 A1 | 11/2011 | Rebolledo-Mendez |
| 2012/0050172 A1 | 3/2012 | Wong et al. |
| 2012/0169620 A1 | 7/2012 | Bowler |
| 2012/0194420 A1 | 8/2012 | Osterhout et al. |
| 2013/0038756 A1 | 2/2013 | Cheng |
| 2013/0038792 A1 | 2/2013 | Quigley et al. |
| 2013/0332070 A1 | 12/2013 | Fleizach et al. |
| 2014/0267904 A1 | 9/2014 | Saboune et al. |
| 2015/0302772 A1 | 10/2015 | Yu et al. |
| 2016/0018920 A1 | 1/2016 | Deokar et al. |
| 2016/0184703 A1 | 6/2016 | Brav et al. |
| 2017/0024010 A1 | 1/2017 | Weinraub |
| 2017/0177085 A1 | 6/2017 | Sun et al. |
| 2017/0344116 A1 | 11/2017 | You et al. |
| 2019/0290493 A1 | 9/2019 | Lin et al. |

OTHER PUBLICATIONS

Corrected Notice of Allowance for U.S. Appl. No. 15/709,793 dated Aug. 21, 2019.
Corrected Notice of Allowance for U.S. Appl. No. 15/709,793 dated Nov. 7, 2019.
Corrected Notice of Allowance for U.S. Appl. No. 16/298,016 dated Oct. 30, 2019.
Corrected Notice of Allowance in U.S. Appl. No. 15/709,882 dated Jan. 24, 2019.
Final Office Action in U.S. Appl. No. 15/709,793 dated Jan. 10, 2019.
Non-Final Office Action for U.S. Appl. No. 16/526,061 dated Aug. 21, 2019.
Non-Final Office Action in U.S. Appl. No. 15/709,793 dated Aug. 9, 2018.
Non-Final Office Action in U.S. Appl. No. 15/709,882 dated Nov. 19, 2018.
Non-Final Office Action in U.S. Appl. No. 15/709,985 dated Oct. 2, 2018.
Non-Final Office Action in U.S. Appl. No. 16/297,960 dated Apr. 4, 2019.
Notice of Allowance for U.S. Appl. No. 15/709,793 dated Jun. 5, 2019.
Notice of Allowance for U.S. Appl. No. 16/298,016 dated Jun. 12, 2019.
Notice of Allowance for U.S. Appl. No. 16/297,960 dated Jan. 14, 2020.
Notice of Allowance in U.S. Appl. No. 15/709,882 dated Dec. 20, 2018.
Notice of Allowance in U.S. Appl. No. 15/709,985 dated Dec. 19, 2018.
Final Office Action for U.S. Appl. No. 16/526,061 dated Mar. 3, 2020.
Corrected Notice of Allowance for U.S. Appl. No. 16/297,960 dated Apr. 30, 2020.
Corrected Notice of Allowance for U.S. Appl. No. 16/297,960 dated Jun. 10, 2020.
Notice of Allowance for U.S. Appl. No. 16/526,061 dated Jun. 30, 2020.

US 10,754,429 B2

HAPTIC FEEDBACK DEVICE AND METHOD FOR PROVIDING HAPTIC SENSATION BASED ON VIDEO

CROSS-REFERENCE TO RELATED APPLICATIONS/INCORPORATION BY REFERENCE

This patent application makes reference to, claims priority to, claims the benefit of, and is a Continuation Application of U.S. patent application Ser. No. 16/298,016, filed Mar. 11, 2019, which is a Continuation Application of U.S. patent application Ser. No. 15/709,985, filed Sep. 20, 2017.

The above referenced application is hereby incorporated herein by reference in its entirety.

FIELD

Various embodiments of the disclosure relate to haptic technologies. More specifically, various embodiments of the disclosure relate to a haptic feedback device and method to provide haptic sensation based on video.

BACKGROUND

Humans have five traditional recognized senses, sight (ophthalmoception), hearing (audioception), taste (gustaoception), smell (olfacoception or olfacception), and touch (tactioception). The loss of one or more senses generally results in enhancement of one or more of the remaining senses to compensate for the lost sense(s). Currently, technological developments in human-machine interaction (HMI) are mostly focused on vision-based interaction technology. Touch-sense based technologies still remains underexplored. For example, existing technology are typically focused on Braille-based or other rudimentary forms of tactile presentation systems, such as raised dots or spikes. It is known that the sense of touch has a much greater sensory resolution than the sense of sight. Hence, the sense of touch can detect even small changes on a surface that the eye cannot detect. Thus, a technologically advanced haptic feedback device may be required to provide enhanced haptic sensation to a user to improve user experience, for example, in entertainment, gaming, and overall understanding of the world by extended exploration of the human touch-sense.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A haptic feedback device and a method to provide haptic sensation based on video substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed haptic feedback device and method for providing haptic sensation. The disclosed haptic feedback device provides enhanced haptic sensation to a user to improve the user experience, for example, in entertainment, gaming, and overall understanding of the world. The disclosed haptic feedback device harnesses the non-visual senses, such as the sense of touch and hearing, to provide enhanced haptic sensation to users to provide enhanced user experience, for example, in haptic gaming and other forms of entertainment by exploring the touch-sense of the users. In some embodiments, the haptic feedback device may be utilized by users that are visually impaired. In some embodiments, the haptic feedback device may also be used by sighted people to gain unfamiliar and supplementary experiences by exploring their touch-sense in extended manner in additional to the visual sense. In some embodiments, the haptic feedback device may be used by both a sighted user and a visually impaired user at the same time.

Figure 1:
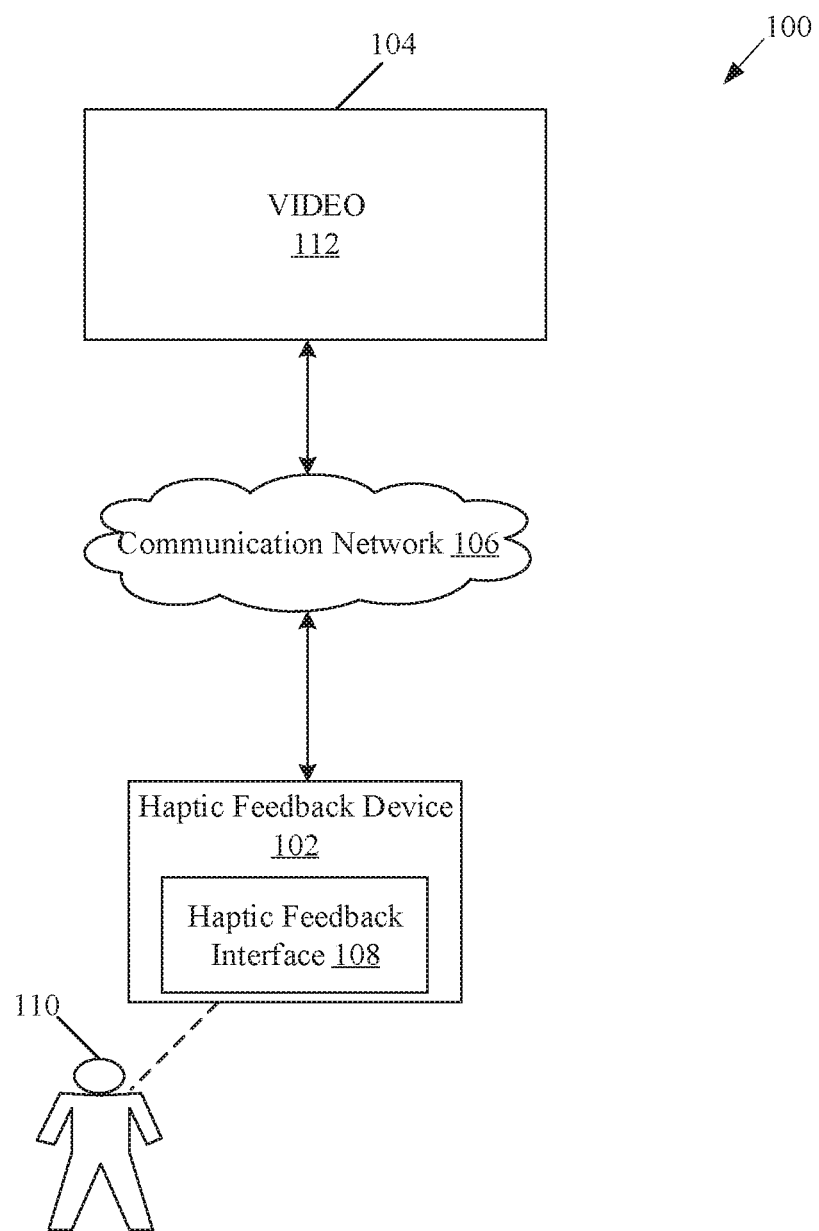
FIG. 1 illustrates an exemplary environment for providing haptic sensation by a haptic feedback device based on video, in accordance with an embodiment of the disclosure.

FIG. 1 illustrates an exemplary environment for providing haptic sensation by a haptic feedback device based on video, in accordance with an embodiment of the disclosure. With reference to FIG. 1, there is shown an exemplary environment 100. The exemplary environment 100 may include a haptic feedback device 102, a display device 104, a communication network 106, and one or more users, such as a user 110. The haptic feedback device 102 may include a haptic feedback interface 108 and a mode selector 114. A video 112 may be played on the display device 104. The haptic feedback device 102 may be communicatively coupled to the display device 104 via the communication network 106.

The haptic feedback device 102 may include suitable logic, circuitry, and/or code to generate a plurality of different haptic cues on the haptic feedback interface 108. The plurality of different haptic cues may be generated based on the video 112 played on an external display device (such as the display device 104) or the haptic feedback device 102. Examples of implementation of the haptic feedback device 102 may include, but are not limited to a special-purpose portable haptic feedback device, a special-purpose gaming suit, special-purpose hand gloves, special-purpose shoes, a haptic gaming device, or a wearable device that may be worn at different parts of human body.

The display device 104 may include suitable logic, circuitry, and/or code that may be configured to play or render a video (such as the video 112). Examples of the display device 104 may include, but are not limited to a television, a set-top box, a gaming console, a laptop computer, a smartphone, a video player, such as a Blu-ray Disc (BD) player or a DVD player, a projector, or other display devices.

The communication network 106 may be a medium that may enable communication between the haptic feedback device 102 and the display device 104. The communication network 106 may be implemented by one or more wired or wireless communication technologies known in the art. In some embodiments, the communication network 106 may refer to a short-range or medium-range wireless communication network. In some embodiments, the communication network 106 may refer to a long range communication network. Examples of short-range or medium-range wireless communication networks may include, but are not be limited to, a Wireless-Fidelity (Wi-Fi) based network, a Light-Fidelity (Li-Fi) based network, a wireless personal area network (WPAN) such as a BLUETOOTH™ network, Internet-of-Things (IoT) network, Machine-Type-Communication (MTC) network, and/or a Wi-Max based network. Examples of the long range communication networks may include, but not limited to, the Internet, a cloud network, a wireless wide area network (WWAN), a Local Area Network (LAN), a plain old telephone service (POTS), a Metropolitan Area Network (MAN), or a cellular or mobile network, such as Global System for Mobile Communications (GSM), General Packet Radio Service (GPRS), Enhanced Data Rates for GSM Evolution (EDGE), 1G, 2G, 3G, 4G Long Term Evolution (LTE), 5G, IEEE 802.11, 802.16, and the like.

The haptic feedback interface 108 may comprise a plurality of haptic elements. In accordance with an embodiment, the haptic feedback interface 108 may refer to a haptic output interface configured to provide at least a touch-discernible output to the user 110. In some embodiments, the haptic feedback interface 108 may refer to a haptic input/output (I/O) interface configured to receive haptic input as well as provide haptic output to the user 110 from the same haptic I/O interface. It is known that the sense of touch has a much greater sensory resolution than the sense of sight. Hence, the sense of touch can detect even small changes on a surface that the eye cannot detect. This principle of the sense of touch may be used to guide the design of the haptic feedback interface 108.

In some embodiments, the user 110 may be a person who have lost or impaired the sense of sight. The user 110 may want to understand and experience television programs, or different videos, such as a movie, or play video games, or learn and understand about the surrounding world. It is known that sighted people visualize the surrounding world by detection of edges between areas of different wavelengths of light, which is then perceived as different colors by the brain. Based on feedback from the visual system, the visual part of the brain referred to as visual cortex, processes visual information of the surrounding world to enable the sighted people to visualize the surrounding world. It is also known that the loss of one or more senses, such as the sense of sight, generally results in enhancement of one or more of the remaining senses, such as sense of touch, hearing, smell, or taste, to compensate for the lost sense(s). The haptic feedback device 102 harnesses the non-visual senses, such as the sense of touch, hearing, or smell, to provide enhanced haptic sensation to users, such as the user 110, who have lost or impaired the sense of sight to provide enhanced user experience, for example, in haptic gaming and other forms of entertainment by exploring the touch-sense of the users. In some embodiments, the haptic feedback device 102 may also be used by sighted people to gain unfamiliar and supplementary experiences by exploring their touch-sense in extended manner in additional to the visual sense. In some embodiments, the haptic feedback device may be used by both a sighted user and a visually impaired user at the same time (e.g. as discussed in FIG. 4)

The video 112 may be played by the display device 104 which may be an external device. In some embodiments, the video 112 may be played in the haptic feedback device 102. The video 112 may refer to television programming, a commercial, a promo, a movie, a news program, and the like. The video 112 may also refer to a single user or a multi-user online or offline video game, or other types or kinds of video.

The mode selector 114 may refer to a hardware mode selector, such as a button or a wheel, which may be used by a user (such as the user 110) to select a mode from one of a haptic television (TV) mode, a haptic gaming mode, or an augmented gaming mode. The haptic TV mode may be set in the haptic feedback device 102 to enable a visually impaired user to non-visually discern and experience the video 112, for example, a TV program, by touch sense based on the generated plurality of different haptic cues on the haptic feedback interface 108 and audio. An example of the implementation of the haptic TV mode is described, for example, in FIG. 3. The haptic gaming mode may be set in the haptic feedback device 102 to enable a visually impaired user or a sighted user (i.e. a user who have not lost the sense of sight) to play a video game by discerning the video game by touch sense based on the generated plurality of different haptic cues on the haptic feedback interface 108 and audio. An example of the implementation of the haptic gaming mode is described, for example, in FIG. 4. The augmented gaming mode may be set in the haptic feedback device 102 to enable a user (i.e. either a sighted user or a visually impaired user) to experience different haptic sensation based on a video game played at a gaming console or a head-mounted device. The different haptic sensation may be experienced based on one or more haptically-augmented features generated on the haptic feedback interface 108 at the time of playing of the video game. The one or more haptically-augmented features may be different from visually perceptible elements present in a current scene of the video game played at the gaming console or the head-mounted device. An example of the implementation of the augmented gaming mode is described, for example, in FIG. 5.

In operation, the haptic feedback device 102 may be configured to select a mode from the haptic television mode, the haptic gaming mode, or the augmented gaming mode, based on an input received from the mode selector 114. The user 110 may select one of the haptic television mode, the haptic gaming mode, or the augmented gaming mode using the mode selector 114. The haptic feedback device 102 may be configured to receive a look-ahead buffer of an upcoming scene of the video 112 in real time or near-real time from the display device 104. In cases where the video 112 is played at the haptic feedback device 102, a video segment that corresponds to the upcoming scene of the video 112 may be accessed from a memory of the haptic feedback device 102.

The haptic feedback device 102 may be configured to detect a plurality of different objects in the upcoming scene of the video 112 based on the look-ahead buffer of the video 112. The haptic feedback device 102 may be configured to identify an object-type of each of the plurality of objects in the upcoming scene of the video 112. The haptic feedback device 102 may be configured to detect a plurality of different motion associated with the plurality of objects in the upcoming scene of the video 112 based on the look-ahead buffer of the video 112 played on the display device 104 or the haptic feedback device 102.

In accordance with an embodiment, the haptic feedback device 102 may be configured to determine a haptic feedback for the upcoming scene of the video 112 based on the look-ahead buffer of the video 112, the detected plurality of different motion associated with the plurality of objects, and the selected mode. The haptic feedback device 102 may be configured to generate a plurality of different haptic cues on the haptic feedback interface 108 using the plurality of haptic elements. The plurality of different haptic cues on the haptic feedback interface 108 may be generated based on the determined haptic feedback and the selected mode. In some embodiments, the plurality of different haptic cues may include one or more movable haptic cues. The plurality of different haptic cues on the haptic feedback interface 108 may be generated in synchronization with a current scene played on the display device 104 or the haptic feedback device 102, based on the determined haptic feedback.

In cases where the selected mode is the haptic TV mode, the haptic feedback device 102 may be configured to selectively reproduce the current scene played on the display device 104 or the haptic feedback device 102 on the haptic feedback interface 108, based on the determined feedback. An example of the selective reproduction of the current scene in the haptic TV mode is shown and described, for example, in FIG. 3.

In cases where the selected mode is the haptic gaming mode, the haptic feedback device 102 may be configured to detect a haptic input on the haptic feedback interface 108, based on a press or a push on at least one of the generated plurality of different haptic cues that includes the one or more movable haptic cues. In the haptic gaming mode, the output of an audio feedback by the haptic feedback device 102 may be controlled to be in sync with the generated plurality of haptic cues. An example of the detection of the haptic input in the haptic gaming mode and control of audio output is described, for example, in FIG. 4.

In cases where the selected mode is the augmented gaming mode, the haptic feedback device 102 may be configured to generate at least a haptically-augmented feature on the haptic feedback interface 108. The haptically-augmented feature may be different from the visually perceptible elements in the current scene of the video 112. The haptically-augmented feature may be discernible by tactioception through the haptic feedback interface 108 that may be worn as a gaming suit. An example of the haptically-augmented feature that may be sensed through the haptic feedback interface 108 is shown and described, for example, in FIG. 5.

The somatic sensory system of human body is responsible for the sense of touch and has sensory touch or pressure receptors that enable a human to detect and feel when something comes into contact with skin. The sense of touch may also be referred to as somatic senses or somesthetic senses that include proprioception (e.g. sense of position and movement) or haptic perception. Typically, such sensory receptors for sense of touch are present, for example, on the skin, epithelial tissues, muscles, bones and joints, and even on certain internal organs of the human body. Thus, various haptic sensations may be provided to the human body in the haptic TV mode, the haptic gaming mode, and the augmented gaming mode by the haptic feedback device 102, as further described in details, for example, in FIGS. 2A, 2B, 3, 4, 5, 6A, 6B, and 6C.

Figure 2A:
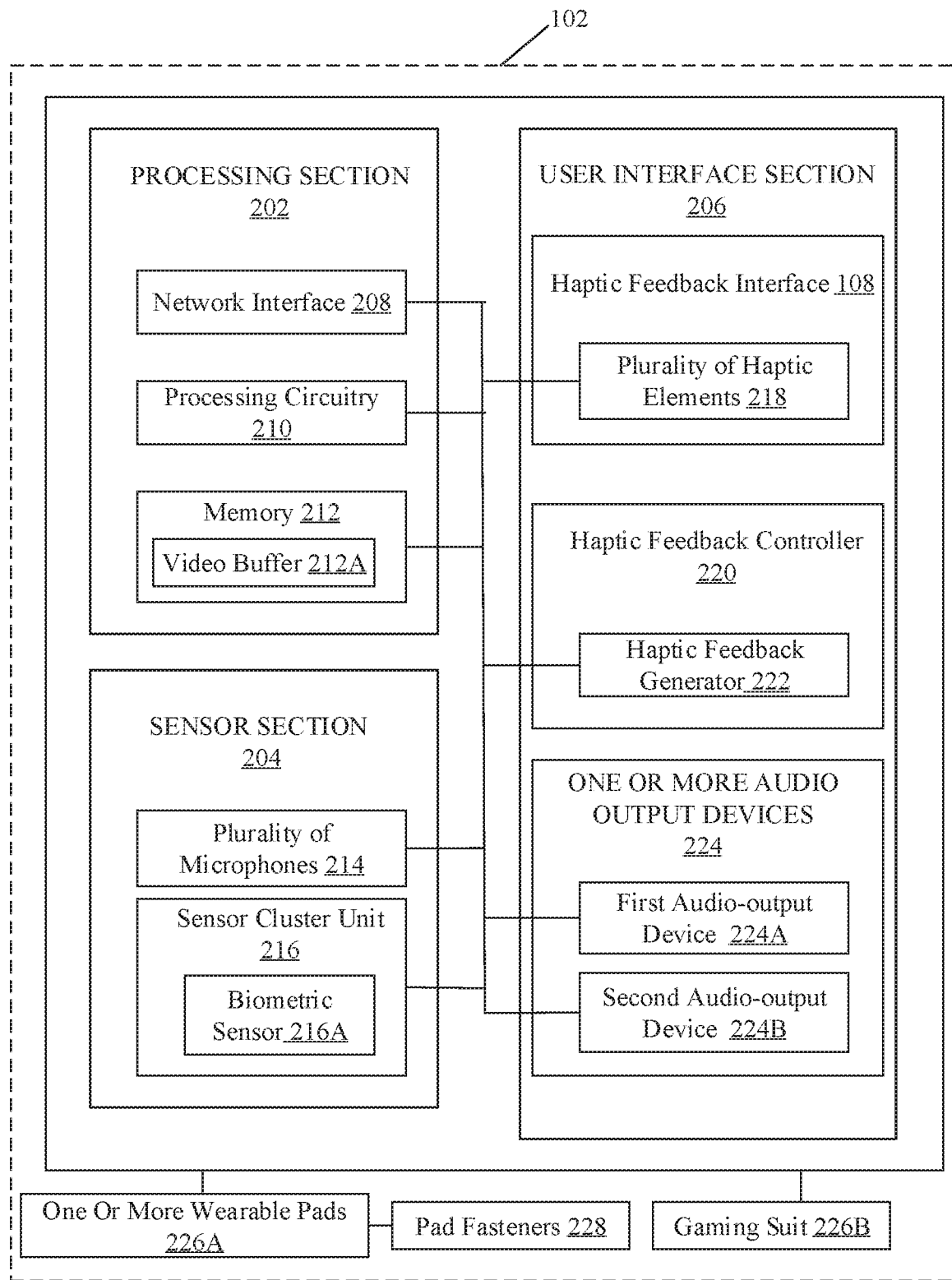
FIG. 2A is a block diagram that illustrates an exemplary haptic feedback device for providing haptic sensation, in accordance with an embodiment of the disclosure.

FIG. 2A is a block diagram that illustrates an exemplary haptic feedback device for providing haptic sensation, in accordance with an embodiment of the disclosure. FIG. 2A is explained in conjunction with elements from FIG. 1. With reference to FIG. 2A, there is shown the haptic feedback device 102. The haptic feedback device 102 may include a processing section 202, a sensor section 204, and a user interface section 206. The processing section 202 may include a network interface 208, a processing circuitry 210, and a memory 212. The memory may include a portion, referred to as a video buffer 212A, for temporary storage and processing of look-ahead buffer of the video 112. The sensor section 204 may include a plurality of microphones 214 and a sensor cluster unit 216. The sensor cluster unit 216 may include at least a biometric sensor 216A. The user interface section 206 may include the haptic feedback interface 108, a haptic feedback controller 220, and one or more audio-output devices, such as a first audio-output device 224A and a second audio-output device 224B, and the mode selector 114. The haptic feedback interface 108 may include a plurality of haptic elements 218. The haptic feedback controller 220 may include a haptic feedback generator 222.

In accordance with an embodiment, the haptic feedback device 102 may be communicatively coupled to an external device, such as the display device 104, through the communication network 106, by use of the network interface 208. The processing circuitry 210 may be communicatively coupled to the memory 212, and the various components of the sensor section 204 and the user interface section 206, via a system bus.

The network interface 208 may comprise suitable logic, circuitry, interfaces, and/or code that may be configured to receive look-ahead buffer of the video 112 played on the external device or the haptic feedback device 102. The network interface 208 may be further configured to communicate with external devices, such as the display device 104, via the communication network 106. The network interface 208 may implement known technologies to support wireless communication. The network interface 208 may include, but are not limited to, a transceiver (e.g. a radio frequency (RF) transceiver), an antenna, one or more amplifiers, a tuner, one or more oscillators, a digital signal processor, a coder-decoder (CODEC) chipset, a subscriber identity module (SIM) card, and/or a local buffer.

The network interface 208 may communicate via wireless communication with networks, such as the Internet, an Intranet and/or a wireless network, such as a cellular telephone network, a wireless local area network (WLAN), a personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), BLUETOOTH™, Wireless Fidelity (Wi-Fi) (such as IEEE 802.11a, IEEE 802.11b, IEEE 802.11g, IEEE 802.11n, and/or any other IEEE 802.11x protocol), voice over Internet Protocol (VoIP), Wi-MAX, Internet-of-Things (IoT) technology, Li-Fi, Machine-Type-Communication (MTC) technology, a protocol for email, instant messaging, and/or Short Message Service (SMS).

The processing circuitry 210 may refer a digital signal processor (DSP). The processing circuitry 210 may comprise suitable logic, circuitry, interfaces, and/or code that may be configured to detect a plurality of different motion associated with a plurality of objects in an upcoming scene of the video 112 based on the look-ahead buffer of the video 112 played on the external device or the haptic feedback device 102. The haptic feedback device 102 may be a programmable device, where the processing circuitry 210 may execute instructions stored in the memory 212. Other implementation examples of the processing circuitry 210 may include, but are not limited to a specialized DSP, a Reduced Instruction Set Computing (RISC) processor, an Application-Specific Integrated Circuit (ASIC) processor, a Complex Instruction Set Computing (CISC) processor, and/or other processors.

The memory 212 may comprise the video buffer 212A and a learning engine. The processing circuitry 210 may be configured to determine one or more patterns in a plurality of user interactions on the haptic feedback interface 108 over a period of time based on a track of a usage pattern of the haptic feedback device 102 by the learning engine. The memory 212 may include suitable logic, circuitry, and/or interfaces that may be configured to store a set of instructions executable by the processing circuitry 210. The memory 212 may be further configured to temporarily store one or more video segments in the video buffer 212A for real time or near-real time processing of the video data of the video 112. The memory 212 may also store usage history, an amount of pressure exerted by the user 110 while touching the haptic feedback interface 108 in the plurality of user interactions on the haptic feedback interface 108 over a period of time. The memory 212 may also store input and output preference settings by the user 110. Examples of implementation of the memory 212 may include, but not limited to, a random access memory (RAM), a dynamic random access memory (DRAM), a static random access memory (SRAM), a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The plurality of microphones 214 may comprise suitable circuitry and/or interfaces to receive an audio input. In accordance with an embodiment, the audio input may be provided by the user 110. The audio input may correspond to a voice input to the haptic feedback device 102. In accordance with an embodiment, the plurality of microphones 214 may be muted or disabled in accordance with user preferences. The plurality of microphones 214 may capture sound emanating in proximity of the user 110 of the haptic feedback device 102.

The sensor cluster unit 216 may include a biometric sensor 216A, such as a fingerprint sensor, to decipher the identity of a user, such as the user 110. In certain scenarios, the haptic feedback device 102 may be used by multiple users, for example, users of a same family, or group. In such a case, based on user authentication by use of the biometric sensor, a different usage profile and user settings may be loaded for different users. In some embodiments, the sensor cluster unit 216 may also include a temperature sensor and a pressure sensor to gauge pressure applied by a user, such as the user 110, on the haptic feedback interface 108. In some embodiments, the sensor cluster unit 216 may include the location sensor, an image sensor, a radio frequency (RF) sensor, an accelerometer, a gyroscope, a compass, a magnetometer, an integrated image-capture device, a depth sensor, an altimeter, a lux meter, an ultrasound sensor, an IR sensor, or one or more weather sensors.

The haptic feedback interface 108 may comprise the plurality of haptic elements 218. The plurality of haptic elements 218 may refer to an array of cylindrical tubes arranged at the surface of the haptic feedback interface 108. A person of ordinary skill in the art may understand that the shape of each tube may be variable, such as conical, hexagonal, or other polygonal shapes, without departing from the scope of the disclosure. In accordance with an embodiment, the plurality of haptic elements 218 may be arranged as a layer (of array of cylindrical tubes) on the haptic feedback generator 222 such that a haptic signal may be generated by the haptic feedback generator 222 through each of the plurality of haptic elements 218. In accordance with an embodiment, one end (e.g. a proximal end) of each tube of the array of cylindrical tubes may be coupled to the haptic feedback generator 222, and the other end (e.g. a distal end) may be interspersed on the haptic feedback interface 108 such that a plurality of differential touch-discernible cues generated by the haptic feedback generator 222 in conjunction with the plurality of haptic elements 218 are discernible on the haptic feedback interface 108 by the sense of touch.

The haptic feedback controller 220 may comprise suitable circuitry and interfaces to determine a haptic feedback for the upcoming scene of the video 112 based on the look-ahead buffer of the video 112, the detected plurality of different motion associated with the plurality of objects, and the selected mode. In some embodiments, the haptic feedback controller 220 may be configured to sense a haptic user input via plurality of haptic elements 218 based on a defined amount of pressure detected at one or more haptic elements of the plurality of haptic elements 218. For example, the haptic user input may be sensed in the haptic gaming mode to receive user input via the haptic feedback interface 108. The haptic feedback controller 220 includes the haptic feedback generator 222. The haptic feedback generator 222 may be configured to generate one or more movable haptic cues on the haptic feedback interface 108 using the plurality of haptic elements 218 in synchronization with a current scene played on the external device (such as the display device 104) or the haptic feedback device 102, based on the determined haptic feedback. The haptic feedback generator 222 further generates a plurality of different haptic cues that includes the one or more movable haptic cues under the control of the haptic feedback controller 220. The haptic feedback generator 222 may include one or more differential pressure generating units, differential electric pulse generating units, shape-pattern extension and retraction units, differential temperature generating units, and a level of protrusion setter to control elevation of raised shape patterns, such as spikes through the plurality of haptic elements 218. The haptic feedback generator 222 may be configured to generate the plurality of different haptic cues by use of one or more of the differential pressure generating units, differential electric pulse generating units, shape-pattern extension and retraction units, differential temperature generating units, and the level of protrusion setter to control elevation of raised shape pattern.

The one or more audio-output devices 224, such as the first audio-output device 224A and the second audio-output device 224B, may comprise suitable circuitry and/or interfaces to generate an audio output for the user 110. In accordance with an embodiment, the audio output may be generated in-sync with the touch-discernible haptic output, such as the plurality of different haptic cues, on the haptic feedback interface 108. In accordance with an embodiment, the audio output may be generated in-sync with a haptic input received on the haptic feedback interface 108 in the haptic gaming mode for enhanced understanding of the video game played on the external device or the haptic feedback device 102. The haptic input may be detected by the haptic feedback controller 220 by use of the pressure sensor of the sensor cluster unit 216. In accordance with an embodiment, the one or more audio-output devices 224 may be muted or disabled based on a time-of-day or for a specific location, such as a public library where silence is solicited. Although FIG. 2A illustrates two audio-input devices, a person of ordinary skill in the art may understand that the haptic feedback device 102 may include a single audio-input device, or more than two audio-input devices.

Figure 5:
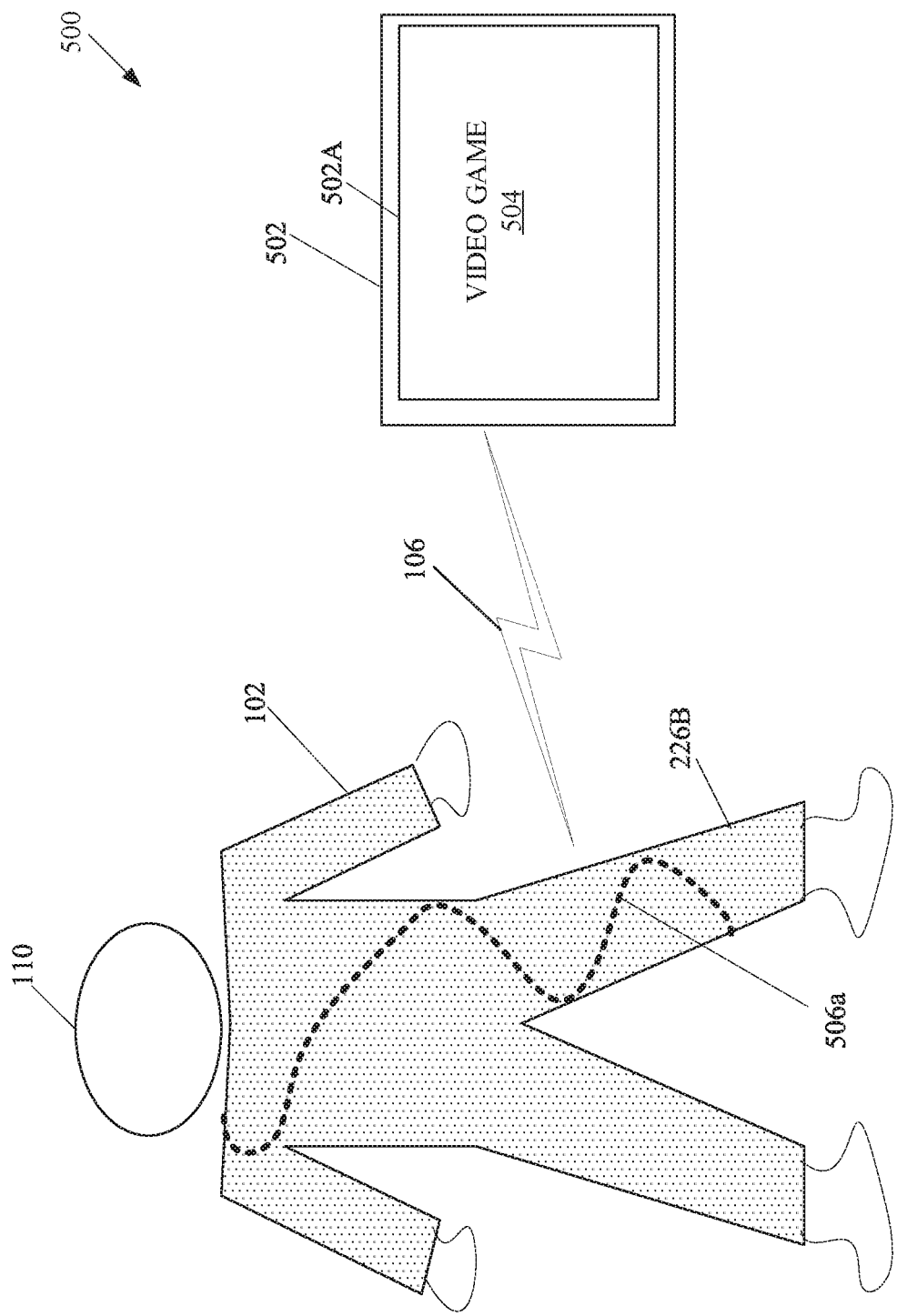
FIG. 5 illustrates a third exemplary scenario for implementation of the exemplary haptic feedback device of FIG. 2A for providing haptic sensation in an augmented gaming mode, in accordance with an embodiment of the disclosure.

Each of the one or more wearable pads 226 may refer to a suitable pad that acts as a substrate for the haptic feedback device 102. Each of the one or more wearable pads 226 may be water-resistant pads suitable to be worn on different parts of the human body, such as forearms, limbs, waist, or as a complete clothing item, such as the gaming suit 226B. An example of the gaming suit 226B is shown in FIG. 5. In accordance with an embodiment, each of the one or more wearable pads 226 may be designed such that the haptic feedback interface 108 may be in contact to the skin of the human body. The pad fasteners 228 refer to detachable fasteners that allow the two terminal portions of each of the one or more wearable pads 226 to detachably affix with each other. Examples of the pad fasteners 228 may include, but are not limited to clips, hook and loop fastener, detachable straps, buttons, and the like.

The gaming suit 226B may refer to a complete or partial body suit that may be worn by the user 110 while playing a video game. The inner surface of the gaming suit 226B may embed the haptic feedback interface 108 such that a haptically-augmented feature generated on the haptic feedback interface 108 may be sensed by the skin of the user 110. Examples of the gaming suit 226B, may include a gaming vest, a gaming jacket, a complete body suit, or a clothing item where the haptic feedback interface 108 may be embedded. An example of the gaming suit 226B is shown and described in FIG. 5.

The various operations of the haptic feedback device 102 described in FIG. 1 may be performed by the different components of the haptic feedback device 102, as described in FIG. 2A. The various operations or functions of the different components of the haptic feedback device 102 may be further understood, for example, from FIGS. 2B, 3, 4, 5, 6A, 6B, and 6C.

Figure 2B:
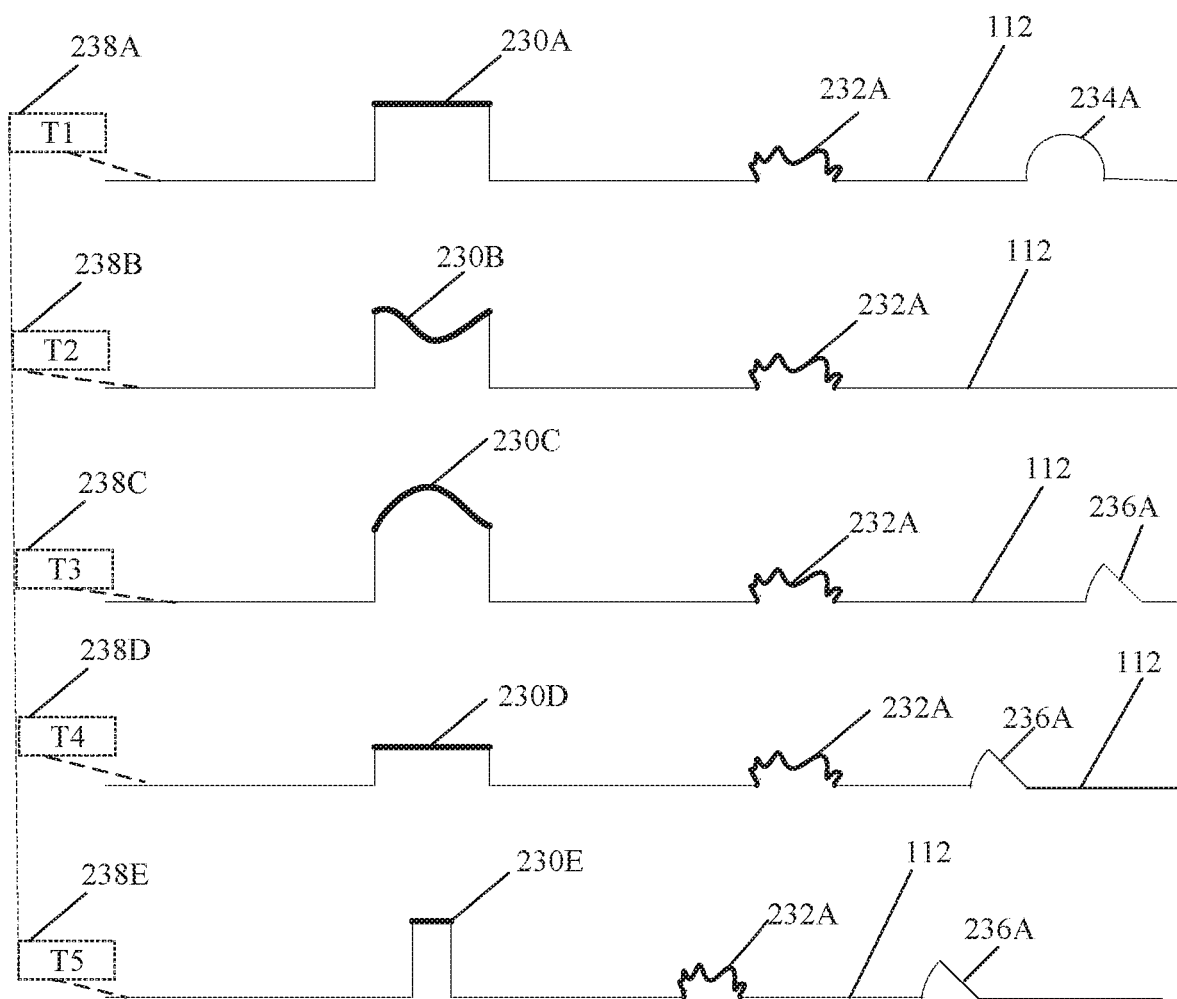
FIG. 2B illustrates exemplary protrusions and depressions on a haptic feedback interface of the haptic feedback device of FIG. 2A for providing haptic sensation, in accordance with an embodiment of the disclosure.

FIG. 2B illustrates exemplary protrusions and depressions on a haptic feedback interface of the haptic feedback device of FIG. 2A for providing haptic sensation, in accordance with an embodiment of the disclosure. FIG. 2B is described in conjunction with elements from FIGS. 1 and 2A. With reference to FIG. 2B, there is shown a surface portion of the haptic feedback interface 108 with protrusions 230A to 230E, 232A, 234A, and 236A at different time instants 238A to 238E. There is also shown a depression 240A on the haptic feedback interface 108 at the different time instants 238A to 238D.

At time instant 238A, the protrusion 230A may be generated on the surface portion of the haptic feedback interface 108 by the haptic feedback generator 222. The protrusion 230A may be a haptic cue generated on the haptic feedback interface 108. At time instant 238B, the protrusion 230A (the same protrusion) may deform into a different shape, as shown by the protrusion 230B. At a next time instant, such as the time instant 238C, the protrusion 230B may deform further to another shape, such as the protrusion 230C, or return to its original shape, such as the protrusion 230A. The same protrusion, such as the protrusion 230A, may have different meanings based on the deformation (as indicated by protrusions 230B, 230C, 230D, and 230E). The deformation may indicate an intra-movement related to an object in the video 112. For example, a person standing in the video 112 may suddenly be seated. This change or intra-movement may be represented by the protrusion 230A that deforms to protrusion 230D. In this case, the deformation may correspond to partial retraction of one or more haptic elements of the plurality of haptic elements 218 to change the level of elevation of the protrusion 230A from a first level to a second level. The second level of elevation may be different than the first level of elevation. The protrusion 230E, for example, shows a deformation of the protrusion 230A where the size of the protrusion 230A is reduced. Thus, the same protrusion may have different meanings based on the deformation. In another example, the protrusion 230A may be a constantly deforming protrusion (e.g. deformed from protrusion 230A to the protrusions 230B and 230C) at different time instants 238A, 238B, and 238C. Based on a touch on the constantly deforming protrusion (such as the protrusion 230A), the user 110 may discern certain changes related to an object in the video 112. For example, movement in a water body may be represented by the protrusions 230A, 230B, and 230C, which may be sensed by touch on the constantly deforming protrusion.

In accordance with an embodiment, the plurality of different haptic cues may be generated as a plurality of protrusions of different shapes that are extended from the surface of the haptic feedback interface 108. For example, the protrusions 230A, 232A, 234A, and 236A. The 232A may be a static protrusion, which may not change its shape or location at different time instants 238A to 238E, as shown. The protrusion 234A may be round shaped protrusion generated at the time instant 238A but may be retracted at next time instants 238B to 238E. The protrusion 236A may be a new movable protrusion generated at the time instant 238C. The protrusion 236A may move or appear to move from its original position to a new position at different time instants, such as the time instant 238D and 238E. This movement of protrusions may be used to indicate inter-movement of different detected objects in the video 112.

Figure 3:
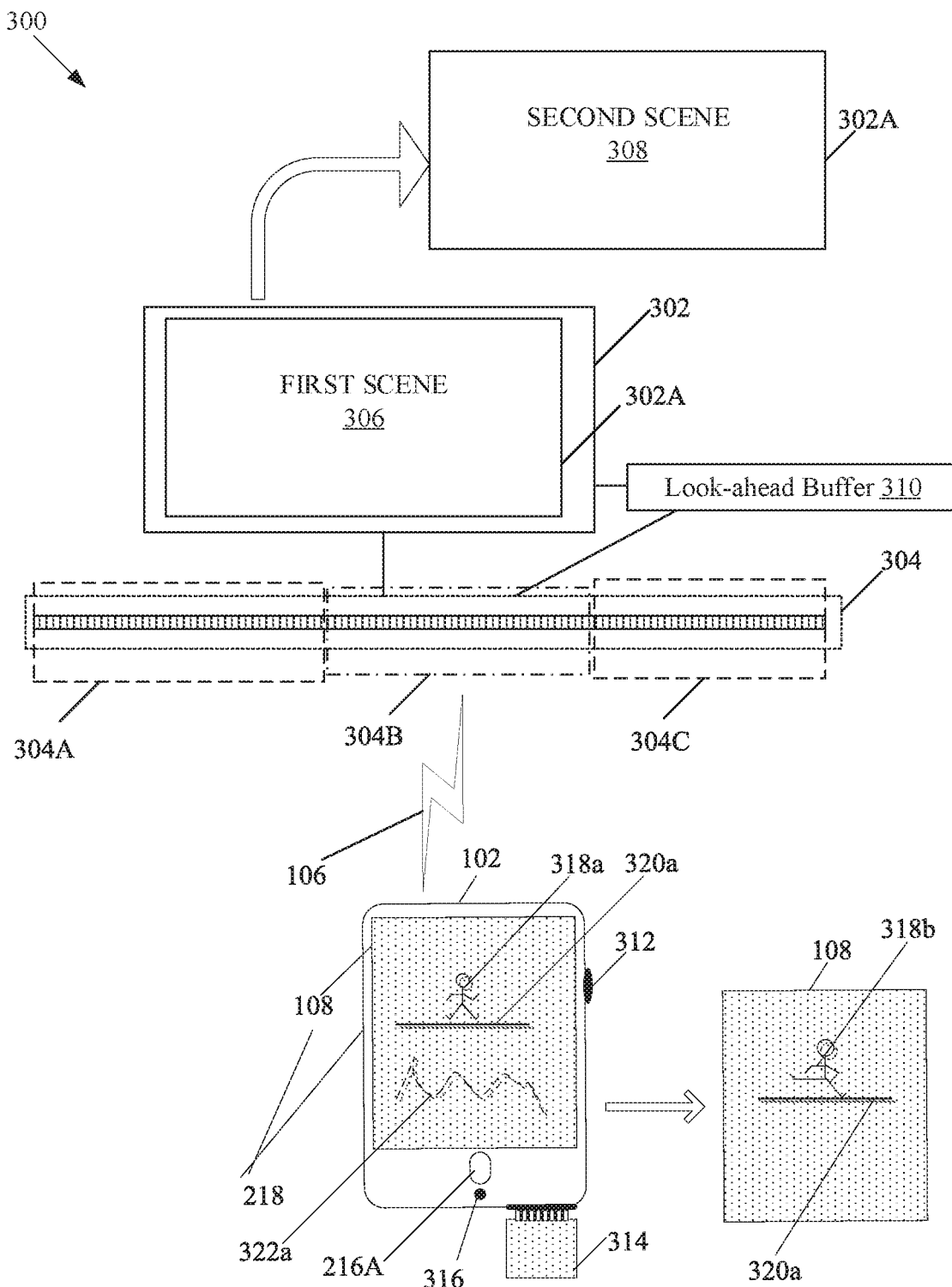
FIG. 3 illustrates a first exemplary scenario for implementation of the exemplary haptic feedback device of FIG. 2A for providing haptic sensation in a haptic television mode, in accordance with an embodiment of the disclosure.
Figure 4:
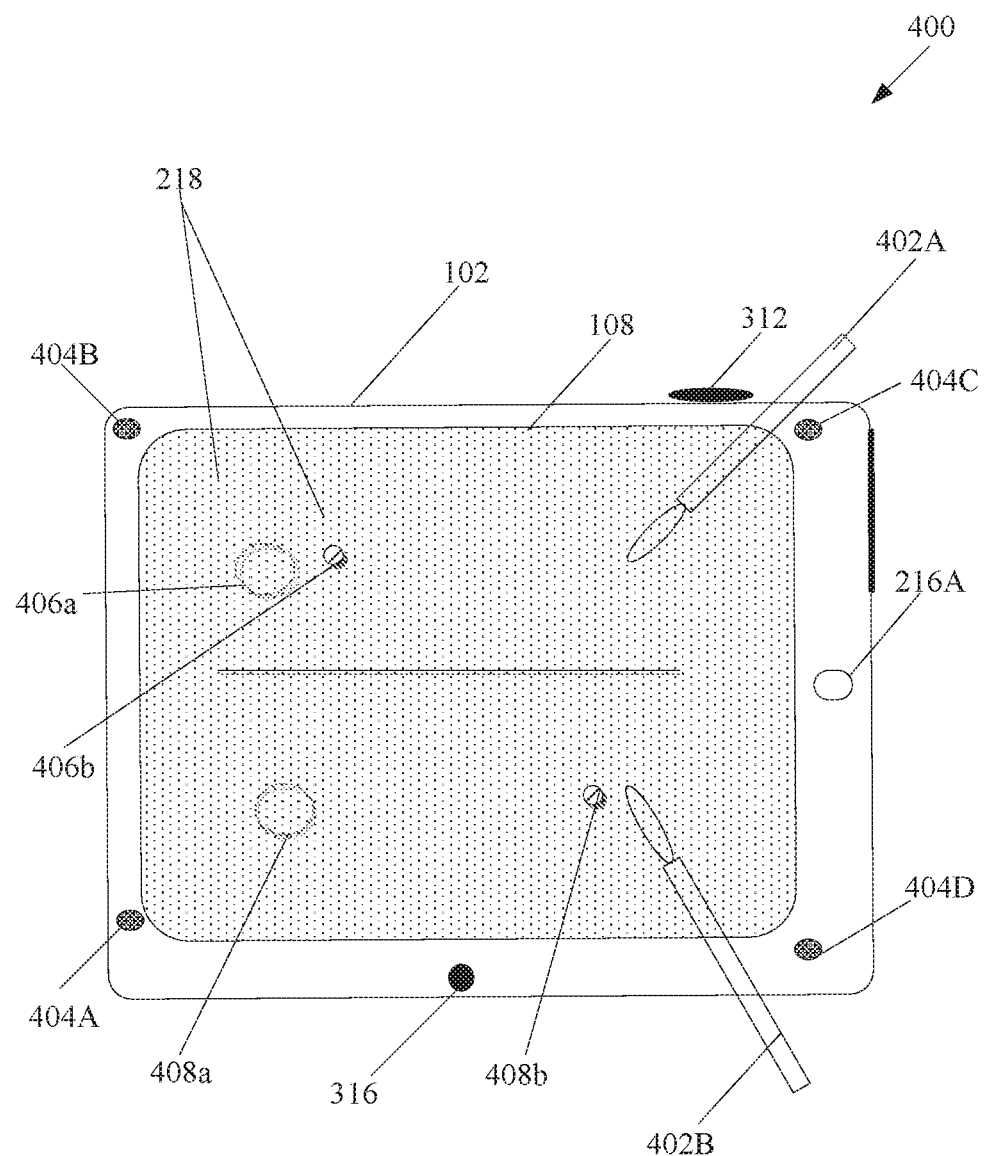
FIG. 4 illustrates a second exemplary scenario for implementation of the exemplary haptic feedback device of FIG. 2A for providing haptic sensation in a haptic gaming mode, in accordance with an embodiment of the disclosure.

The generation of the plurality of protrusions of different shapes are also shown, for example, as haptic cues 318a, 320a, 322a, and 318b in the haptic TV mode in the FIG. 3 and as haptic cues 406a, 406b, 408a, and 408b in the haptic gaming mode in FIG. 4. In accordance with an embodiment, the plurality of different haptic cues may also be generated as a plurality of depressions of different shapes that are represented as concavities at the surface of the haptic feedback interface 108. For example, the depression 240A may be round shaped depression that is indicative of a pothole, a hole, or other concavities. The generation of a combination of protrusions (e.g. haptic cues 406b and 408b) and depressions (e.g. haptic cues 406a and 408a) are shown and described, for example, in FIG. 4.

Different shapes generated by the haptic feedback generator 222, may not be limited to the oval, round, square, triangle, and other shapes, for example, any polygonal shapes or human-like shapes may be generated based on user-preference. In accordance with an embodiment, the shape of a protrusion may be customized by users of the haptic feedback device 102 in accordance with their needs or preferences. For example, a voice command may be provided by the user 110, for example, "generate a star-shaped pattern to represent a building". At least one of plurality of microphones 214 may capture the voice command. The processing circuitry 210 may be configured to interpret the voice command and instruct the haptic feedback controller 220 to generate a star-shaped protrusion based on the interpreted voice command. The haptic feedback controller 220 may be configured to generate the protrusion 232A, which may be in a customized shape, such as the star-shaped pattern. In some embodiments, the customization of shape patterns may be done via the haptic feedback interface 108 using one or more software and/or hardware control buttons (not shown).

FIG. 3 illustrates a first exemplary scenario for implementation of the exemplary haptic feedback device of FIG. 2A for providing haptic sensation in a haptic television mode, in accordance with an embodiment of the disclosure. FIG. 3 is described in conjunction with elements from FIGS. 1, 2A, and 2B. With reference to FIG. 3, there is shown a first exemplary scenario 300 that includes a television (TV) 302 and the haptic feedback device 102. A video 304 may be played on the TV 302. There is shown a plurality of consecutive video segments (such as a first segment 304A, a second segment 304B, and a third segment 304C) of the video 304. The first segment 304A includes a first sequence of image frames that corresponds to a first scene 306 displayed on a display screen 302A of the TV 302. The second segment 304B includes a second sequence of image frames that corresponds to a second scene 308 to be displayed on the display screen 302A of the TV 302. At the time of processing of the first segment 304A of the video 304, such as a TV broadcast program, to display a current scene, such as the first scene 306, video data (such as the second segment 304B) related to an upcoming scene (such as the second scene 308), may be stored in advance as a look-ahead buffer 310 in the memory of the TV 302.

In accordance with the first exemplary scenario 300, there is further shown a mode selector wheel 312, a learning unit 314, a microphone 316, and a plurality of different haptic cues, such as a first haptic cue 318a, a second haptic cue 320a, a third haptic cue 322a, and a fourth haptic cue 318b. There is also shown the haptic feedback interface 108 and the plurality of haptic elements 218 of the haptic feedback interface 108. The haptic feedback device 102 may be communicatively coupled to the TV 302 via a wireless connection, such as the communication network 106. In accordance with the first exemplary scenario 300, the user 110 may be a visually impaired who may still want to experience and non-visually discern a TV program, such as the video 304, played on the TV 302. The user 110 may then select the haptic TV mode using the mode selector wheel 312. The mode selector wheel 312 may correspond to the mode selector 114 (FIG. 1). The video 304 may be a dance show broadcast displayed on the TV 302.

The learning unit 314 may be a learning assistant for the user 110 that may assist the user 110 to learn not only the operation of the haptic feedback device 102 but also help understand meaning of each haptic cue of the plurality of different haptic cues generated on the haptic feedback interface 108. The learning unit 314 may be a detachable hardware component of the haptic feedback device 102. For example, the user 110 may provide a haptic input on a haptic cue, for example, the first haptic cue 318a, the second haptic cue 320a, or the third haptic cue 322a, generated on the haptic feedback interface 108 based on the video 304. The user 110 may press a protrusion (or a bulge) generated as the haptic cue on the haptic feedback interface 108. Based on the amount of pressure exerted by the user 110 while touching the protrusion on the haptic feedback interface 108, the press may be considered a haptic input by the haptic feedback controller 220. In cases where the amount of pressure exerted by the user 110 on a particular point or a protrusion on the haptic feedback interface 108 is greater than a threshold pressure value, the press of the protrusion (or a bulge) may be considered a haptic input for that particular object detected in the video 304. A corresponding action related to the pressed protrusion may be executed by the haptic feedback controller 220 in association with the processing circuitry 210. For example, when the first haptic cue 318a is pressed, an audio output in combination with a Braille feedback may be generated on the learning unit 314 to learn about the object represented by the first haptic cue 318a. For example, raised dots for "a dancing girl" may appear in Braille on the learning unit 314. There may be a more button 314A on the learning unit 314. A press of the more button 314A may present additional information about the dancing girl in the video 304. For example, "this is a hip-hop dance form" may be output as Braille feedback, as audio, or combination of both audio and the Braille feedback. This enables learning about the object-type, augmented information about the object, an action in the video 304, the shape associated with the haptic cues, and other meanings in the learning period. Thus, the learning unit 314 acts as the learning assistant or a self-help haptic guide. After certain period of time, when the user 110 may be acquainted with the usage of the haptic feedback device 102 or the generated cues, the learning unit 314 may be detached or plugged out from the haptic feedback device 102.

In accordance with an embodiment, the network interface 208 may be configured to access the look-ahead buffer 310 of the upcoming scene (such as the second scene 308) of the video 304 when a current scene (such as the first scene 306) may be displayed on the display screen 302A of the TV 302. The second segment 304B of the video 304 that corresponds to the upcoming scene (such as the second scene 308) may be received (or retrieved) in real time or near-real time from the TV 302, via the communication network 106.

The processing circuitry 210 of the haptic feedback device 102 may be configured to detect a plurality of different objects in the upcoming scene of the video 112 based on the look-ahead buffer 310 of the upcoming scene (such as the second scene 308) of the video 304. For example, in this case, the detected plurality of objects in the upcoming scene may be a stage, a plurality of chairs, and a plurality of human beings. The processing circuitry 210 may be further configured to identity an object-type of each of the plurality of objects in the upcoming scene of the video 304 based the look-ahead buffer 310 of the video 304. For example, in this case, the object-type in the upcoming scene (such as the second scene 308) may be identified as a girl (gender and age identified), a stage, and an audience facing towards the girl.

The processing circuitry 210 may be further configured to detect the plurality of different motion associated with the plurality of objects in the upcoming scene of the video 304 based on the look-ahead buffer 310 of the video 304 played on the TV 302. Both intra-motion and inter-motion associated with the plurality of objects may be detected. The intra-motion of an object refers to movement within the object, such as movement of different parts of an object while the object is standing or located at a particular place. For example, movement of limbs, waist, face, and the like, while a human being is standing at a place. The inter-motion refers to movement of objects with respect to each other. For example, a human object or a car moving from one location to other as detected in the video 304.

In accordance with an embodiment, the processing circuitry 210 may be configured to determine a relative position and height of each of plurality of objects with respect to each other. For example, it may be detected that the girl is dancing on the stage while the audience is viewing the dancing girl. Thus, different motion, relative position, and height of each object may be determined for later use during determination of a haptic feedback to be generated on the haptic feedback interface 108. Further, the processing circuitry 210 may be configured to determine the speed and the direction of travel of each moving objects (such as the dancing girl in this case) of the plurality of objects.

The haptic feedback controller 220 may be configured to determine a haptic feedback for the upcoming scene (such as the second scene 308) of the video 304 112 based on the look-ahead buffer 310 of the video 304 and the detected plurality of different motion associated with the plurality of objects. The haptic feedback controller 220 may be configured to determine a scaling factor based on an aspect ratio of the video 304 and a defined haptic output area of the haptic feedback interface 108. The defined haptic output area refers to a spatial area of the haptic feedback interface 108 on which the determined haptic feedback is to be generated. The scaling factor may be utilized to map the detected plurality of objects to the plurality of haptic elements 218 of the haptic feedback interface 108.

The haptic feedback generator 222 may be configured to generate the plurality of different haptic cues (such as the first haptic cue 318a, the second haptic cue 320a, and the third haptic cue 322a) on the haptic feedback interface 108 using the plurality of haptic elements 218, based on the determined haptic feedback for the haptic TV mode. In some embodiments, the plurality of different haptic cues may include one or more movable haptic cues, such as the first haptic cue 318a. The first haptic cue 318a corresponds to the detected dancing girl in the video 304. The second haptic cue 320a corresponds to the detected stage. The third haptic cue 322a may correspond to the detected audience facing towards the dancing girl.

The haptic feedback generator 222 may be configured to generate the one or more movable haptic cues on the haptic feedback interface 108 using the plurality of haptic elements 218 in synchronization with a current scene played on the external display device (such as the display device 104) or the haptic feedback device 102, based on the determined haptic feedback. The one or more movable haptic cues may be generated on the haptic feedback interface 108 at a time instant when the second scene 308 (i.e. the upcoming scene for which the haptic feedback was determined) is displayed (or played) as the current scene on the TV 302. Thus, the generated plurality of different haptic cues (such as the first haptic cue 318a, the second haptic cue 320a, and the third haptic cue 322a) on the haptic feedback interface 108 may be constant synchronized with the current scene played on the TV 302. The plurality of different haptic cues (such as the first haptic cue 318a, the second haptic cue 320a, and the third haptic cue 322a) may be generated by a touch-discernible modality. The touch-discernible modality may include at least one of a differential pressure-based modality, a differential temperature-based modality, a differential electric pulse-based modality, a differential raised shape pattern-based modality, or a combination of different touch-discernible modalities.

The differential pressure-based modality refers to generation of the plurality of different haptic cues as multi-level pressure or different amount of pressure on the haptic feedback interface 108. A user, such as the user 110, may feel different amount of pressure at different points (or portions) on the haptic feedback interface 108, which enables the user 110 to discern certain characteristics, for example, positioning or object-type of the plurality of objects, of the video 304 by touch on the haptic feedback interface 108. Similarly, the differential temperature-based modality refers to generation of the plurality of different haptic cues as different temperatures, for example, different combination of hot and cold temperatures, on the haptic feedback interface 108. The different level of temperature may enable the user 110 to discern, certain characteristics, for example, positioning or object-type of the plurality of objects, of the video 304 (e.g. the TV program) by touch on the haptic feedback interface 108. The differential electric pulse-based modality refers to generation of the plurality of different haptic cues as different level of electric-pulses on the haptic feedback interface 108. The different level of electric-pulses may enable the user 110 to feel, certain characteristics, for example, positioning or object-type of the plurality of objects, of the video 304 by touch on the haptic feedback interface 108. The different level of electric-pulses may be felt as different amount of pain or pricking points. The differential raised shape pattern-based modality refers to generation of the plurality of different haptic cues as a plurality of protrusions of different shapes that may be extended from the surface of the haptic feedback interface 108, as shown. Each protrusion may be a raised shape-pattern or a bulge that may stick out from at least one or a group of haptic elements of the plurality of haptic elements 218 of the haptic feedback interface 108. The plurality of protrusions, such as the first haptic cue 318a, the second haptic cue 320a, and the third haptic cue 322a) may represent the plurality of objects of the video 304 (as displayed in the current scene of the video 304).

In accordance with an embodiment, the haptic feedback generator 222 may be configured to control a relative positioning of the plurality of different haptic cues on the haptic feedback interface 108 to selectively reproduce the current scene (such as the second scene 308) played on the TV 302. The selective reproduction of the current scene (i.e. second scene 308) may correspond to removal of one or more irrelevant objects detected in the video 304 (e.g. the TV program). The relevancy and irrelevancy of each object of the detected plurality of objects may be estimated based on a predicted interest quotient for each of the plurality of objects or a screen size occupied by an object in the current scene displayed on the display screen 302A. For example, the plurality of chairs on which the audiences may be seated may be assigned the least interest quotient among other objects of the plurality of objects. The objects, for which the predicted interest quotient is below a defined threshold value, may be considered as irrelevant. Removal of irrelevant objects detected in the look-ahead buffer 310 of the video 304 for selective reproduction of the current scene (i.e. second scene 308), may significantly save the processing time and battery power consumption for the generation of the plurality of different haptic cues on the haptic feedback interface 108.

In accordance with an embodiment, the haptic feedback generator 222 may be configured to control deformation of a haptic cue, such as the first haptic cue 318a, on the haptic feedback interface 108 such that an intra-movement of an object (e.g. the movement of limbs of the dancing girl) may be discernible by tactioception. For example, the first haptic cue 318a may be a movable haptic cue generated as a protrusion of a human-like shape-pattern extending from the haptic feedback interface 108. The one or more motion from the detected plurality of different motion associated with the dancing girl in the upcoming scene of the video 304 may be discernible based on a movement of the deformation of the first haptic cue 318a on the haptic feedback interface 108. The fourth haptic cue 318b is an example of the deformation of the first haptic cue 318a to non-visually discern the intra-movement of the dancing girl. In this case, the intra-movement refers to dance moves performed standing at same position.

In accordance with an embodiment, the haptic feedback generator 222 may be configured to control movement of the one or more movable cues on the haptic feedback interface 108 such that an inter-movement among a set of moving objects of the plurality of objects, which may be discernible by tactioception. In some embodiments, a rate-of-change of movement of the one or more movable haptic cues may be further controlled in accordance with the determined scaling factor. For example, when the dancing girl moves to a different position on the stage, the first haptic cue 318a may move in-synchronization to the moment of the dancing girl in the video 304 displayed on the display screen 302A.

Similar to sighted people (i.e. people who have not lost sense of sight) who use information about the features on the surface of an object, like color, shading, or overall size, and shape, to recognize an object, the people who have lost the sense of sight may also identify an object-type, object position, and motion associated with an object in the video 304 based on a touch on the protrusions of different shapes, such as the first haptic cue 318a, the second haptic cue 320a, and the third haptic cue 322a, where an association of a particular shape and motion with a particular object-type may be learned by the brain. For example, in this case, a zig-zag shaped haptic cue (i.e. the third haptic cue 322a) is indicative of audience, a human-shaped haptic cue (i.e. the first haptic cue 318a and the fourth haptic cue 318b) may be indicative of a human (such as the dancing girl), a horizontal line (i.e. the second haptic cue 320a) may be indicative of a stage. Notwithstanding, different shapes generated by the haptic feedback generator 222, may not be limited to the shapes shown in the FIG. 3, and other shapes, such as oval, round (e.g. the protrusion 234A), square, or triangle (e.g the protrusion 236A) or any polygonal shapes (e.g. the protrusion 232A (FIG. 2B) may be generated. In accordance with an embodiment, the shape of a protrusion may be customized by users of the haptic feedback device 102 in accordance with their needs or preferences, as described for example, in FIG. 2B.

In certain scenarios, a user of the haptic feedback device 102 may not be able to use all the five fingers of a hand while touching the haptic feedback interface 108. This may be due to one or more missing fingers, restricted movement as a result of injury in one or more fingers, an ailment, some bone fracture, or pain. In such cases, the haptic feedback controller 220 may be configured to automatically detect such impairments or restricted movement of the five fingers of the hand when the hand is placed on the haptic feedback interface 108. In some embodiment, the integrated sensors of the sensor cluster unit 216 may be used to detect such impairments or restricted movement of the five fingers. The haptic feedback controller 220 may be configured to determine a haptic feedback to be generated on the haptic feedback interface 108 in accordance with the detected impairment. For example, the area on which the plurality of different haptic cues is generated may be reduced or modified to suit the detected impairment. The automatic detection of the impairments may be done when the haptic feedback device 102 is set in auto-mode. In some embodiments, the user 110 may switch to manual mode, where the user 110 may provide input via the haptic feedback interface 108 to indicate a specific impairment, and configure the generation of the plurality of different haptic cues based on the provided input that indicates a particular impairment. In some embodiments, the functions of the control buttons, the haptic feedback interface 108, and the haptic feedback device 102 may be configurable by the user 110 based on user inputs in a configuration mode. The configuration mode may be switched "ON" using a configure button (not shown) provided in the haptic feedback device 102.

FIG. 4 illustrates a second exemplary scenario for implementation of the exemplary haptic feedback device of FIG. 2A for providing haptic sensation in a haptic gaming mode, in accordance with an embodiment of the disclosure. FIG. 4 is described in conjunction with elements from FIGS. 1, 2A, 2B, and 3. With reference to FIG. 4, there is shown a second exemplary scenario 400 that depicts generation of a plurality of haptic cues, such as a first set of haptic cues 406a and 406b and a second set of haptic cues 408a and 408b, on the haptic feedback interface 108 of the haptic feedback device 102 in the haptic gaming mode. There is also shown a plurality of haptic input pens, such as a first haptic input pen 402A and a second haptic input pen 402B, a plurality of speakers 404A, 404B, 404C, and 404D, the plurality of haptic elements 218, the mode selector wheel 312, the microphone 316, and the biometric sensor 216A.

In accordance with the second exemplary scenario 400, the user 110 may select the haptic gaming mode using the mode selector wheel 312 (FIG. 3). Based on the selection of the haptic gaming mode, a plurality of game identifiers (for example, a name or a particular game symbol) for a plurality of video games stored in the memory 212 of the haptic feedback device 102, may be generated on the haptic feedback interface 108 or the learning unit 314. The user 110 may select a video game from the stored plurality of video games to play a single user game or a multi-user game of choice. The game selection may be done by a press on one of the plurality of game identifiers by use of one of the plurality of haptic input pens, such as the first haptic input pen 402A. Alternatively, the user 110 may provide a voice command to play a particular desired game.

In accordance with an embodiment, the haptic feedback device 102 may also include a plurality of other hardware control buttons (not shown), such as a power button to ON/OFF the haptic feedback device 102, a reset button to reset the generated plurality of haptic cues, on the haptic feedback interface 108, one or more volume control buttons/wheels to control audio output from the plurality of speakers 404A, 404B, 404C, and 404D, a mute button to disable audio output. The plurality of speakers 404A, 404B, 404C, and 404D may correspond to the one or more audio-output devices 224 (FIG. 2A).

In accordance with an embodiment, the haptic feedback controller 220 may be configured to determine a haptic feedback for the selected gaming video (e.g. a multi-user golf game) based on the look-ahead buffer of the selected gaming video. The gaming video may be played in the haptic feedback device 102. The haptic feedback may be determined for the gaming video, based on a detection and identification of object-types of plurality of different objects in the gaming video and detection of plurality of different motion associated with the plurality of objects in the haptic gaming mode. The haptic feedback generator 222 may be configured to generate the first set of haptic cues 406a and

406b for a first player 410A and the second set of haptic cues 408a and 408b for a second player 410B, based on the determined haptic feedback for the selected gaming video (e.g. the multi-user golf game). The first set of haptic cues 406a and 406b and the second set of haptic cues 408a and 408b may be generated on the haptic feedback interface 108 using the plurality of haptic elements 218. The haptic cues 406b and 408b may be movable haptic cues that represent a golf ball for each player.

The haptic feedback controller 220 may be configured to detect a haptic input based on a push on the movable haptic cues, such as the haptic cues 406b and 408b. For example, the first player 410A may use the first haptic input pen 402A to pocket the haptic cue 406b within the haptic cue 406a that represents a golf hole. The haptic cue 406a may be deformable haptic cue that is generated as a depression on the surface of the haptic feedback interface 108 instead of a protrusion. An example of generation of a haptic cue as a depression (such as the depression 240A) is also shown in FIG. 2B. Thus, when the first player 410A pushes the haptic cue 406b (a protrusion) with certain amount of force towards the haptic cue 406a (a depression) with an intent to pocket (or place) the haptic cue 406b within the haptic cue 406a using the first haptic input pen 402A, the haptic feedback controller 220 may be configured to detect the amount of force applied on the haptic cue 406b. The haptic feedback controller 220 may further detect a motion vector to estimate a direction of the applied force. A defined score may be registered for the first player 410A based on proximity of the haptic cue 406b to the haptic cue 406a, as shown. A maximum score of "10 Points" for example, may be assigned to the first player 410A, if the haptic cue 406b is placed within the haptic cue 406b. Similarly, the second player 410B may push the haptic cue 408b (a protrusion) with certain amount of force towards the haptic cue 408a (a depression) with an intent to pocket the haptic cue 408b within the haptic cue 408a using the second haptic input pen 402B. A defined score may be registered for the second player 410B based on proximity of the haptic cue 408b to the haptic cue 408a. The process of pushing the haptic cues 406b and 408b may be repeated, and each player may get specified number of chances to push the haptic cues 406b and 408b. In this case, whoever scores the highest points in a total of five chances to push (or hit) the movable haptic cues assigned to each player, may win the game.

The movement of the movable haptic cues 406b and 408b may be generated by the haptic feedback generator 222 as a series of protrusions in the direction of the applied force based on the detected applied force and the detected motion vector. In some embodiments, instead of actual moving of the same haptic cue 406b, the haptic cue 406b may retract at a first time instant based on retraction of a haptic element of the plurality of haptic elements 218 that generated the haptic cue 406b. Thereafter, another similar haptic cue of same shape and height may protrude in the direction of the applied force. This may appear as movement of the haptic cue 406b in the direction of the applied force towards the haptic cues 406a on the haptic feedback interface 108, as shown in FIG. 4. In some embodiments, the same movable haptic cue (such as the haptic cue 408b) may move towards the haptic cue 408a in the direction of the applied force. A sequential protrusion of the haptic elements in the direction of the applied force towards the haptic cues 406a may represent the movement, as shown in FIG. 4, by a raised line 412a.

The haptic feedback controller 220 may be further configured to control output of audio feedback such that the audio feedback is in sync (i.e. synchronized) with the detected input, output, or different changes on the haptic feedback interface 108 in accordance with the generated plurality of haptic cues. For example, an audio feedback of "Perfect Pocket, Player A have scored 10 points" may be generated when the haptic cue 406b is placed within the haptic cue 406a (i.e. pocketing of golf ball) based on the push of the haptic cue 406b by the player A using the first haptic input pen 402A.

In conventional devices, the input section to receive a haptic input is different from the output section (in a conventional haptic user interface) where the Braille output or other tactile forms of output are generated. Typically, the input section to receive haptic input is a 6-keys or 8-keys Braille input. A separate section to receive input and provide output, may be considered a rudimentary form of HMI, where a generated haptic output may not be capable of receive a further feedback on a particular touch-discernible haptic cue. In contrast, the same tactile surface area of haptic feedback interface 108 of the haptic feedback device 102 acts both as the haptic input receiver and haptic output generator, where the user 110 may press or push a protrusion (or a bulge) generated on the haptic feedback interface 108 to provide the haptic input related to a specific object to play the video game in the haptic gaming mode. Based on the amount of pressure or force exerted by the user 110 while touching the protrusion or pushing the protrusion on the haptic feedback interface 108, the press or push may be considered a haptic input by the haptic feedback controller 220. As the user 110 may sense the generated output by multiple-senses, such as sight (ophthalmoception), hearing (audioception), and touch (tactioception) concomitantly, a sighted player may play the same game in the haptic gaming mode with a user who has lost the sense of sight. Thus, the haptic feedback device 102 may be operated by both a sighed user and a visually impaired user at the same time.

FIG. 5 illustrates a third exemplary scenario for implementation of the exemplary haptic feedback device of FIG. 2A for providing haptic sensation in an augmented gaming mode, in accordance with an embodiment of the disclosure. FIG. 5 is described in conjunction with elements from FIGS. 1, 2A, 2B, 3, and 4. With reference to FIG. 5, there is shown a third exemplary scenario 500 that depicts generation of a haptically-augmented feature, such as a haptic cue 506a, in the augmented gaming mode. There is shown the gaming suit 226B worn by the user 110. There is further shown a gaming console 502. The gaming console 502 is configured to render a video game 504 on a display screen 502A. The gaming console 502 may correspond to the external display device, such as the display device 104 and the video game 504 may correspond to the video 112 (FIG. 1). In some embodiments, the haptic feedback device 102 may be implemented as the gaming suit 226B, where the haptic feedback interface 108 is embedded in the inner surface of the gaming suit 226B. In this case, the haptic feedback interface 108 may be a foldable or bendable layer integrated on the gaming suit 226B such that the surface of the haptic feedback interface 108 is in contact with the skin. The user 110 may sense the haptically-augmented feature generated on the haptic feedback interface 108 in hands-free mode. In some embodiments, the haptic feedback device 102 may be a separate device which may be communicatively coupled to the gaming suit 226B (another type of haptic feedback device 102, where the haptic feedback interface 108 may be embedded in the gaming suit 226B as shown).

In accordance with the third exemplary scenario 500, the user 110 may select the augmented gaming mode using the mode selector 114 (FIG. 1). Based on the selection of the augmented gaming mode, a communicative coupling may be established between the gaming suit 226B and the gaming console 502. The network interface 208 may be configured to access a look-ahead buffer of the upcoming scene of the video game 504 when a current scene may be displayed on the display screen 502A of the gaming console 502. The processing circuitry 210 may be configured to detect a plurality of different motion associated with the plurality of objects in the upcoming scene of the video game 504 based on the look-ahead buffer of the video game 504 played on the gaming console 502.

The haptic feedback controller 220 may be configured to determine a haptic feedback for the upcoming scene of the video game 504 based on the look-ahead buffer of the video game 504 and the detected plurality of different motion associated with the plurality of objects. In some embodiments, the haptic feedback generator 222 may be configured to generate the haptically-augmented feature, such as the haptic cue 506a, on the haptic feedback interface 108. The haptically-augmented feature may be generated in synchronization with the current scene played on the gaming console 502 (i.e. when the upcoming scene is rendered on the display screen 502A of the gaming console 502). The haptically-augmented feature may be different from the visually perceptible elements in the current scene of the video game 504. For example, the video game 504 may be a jungle warfare game, where a 3D computer graphics model of the user 110 may be generated in the video game 504, displayed on the display screen 502a. Although the user 110 may visualize a moving object, such as a snake climbing and swirling around the legs of the user 110, on the display screen 502A, the user 110 may not experience the feel and warmth of the snake swirling. Such realistic haptic sensation may be provided to the user 110 by generation of the haptically-augmented feature, such as the haptic cue 506a, on the haptic feedback interface 108. The haptically-augmented feature, for example, the feel of the snake climbing and swirling around the user 110 in this case, may be discernible by the user 110 wearing the gaming suit 226B. As the snake moves from the legs towards the shoulders of the user 110 on the display screen 502A in the video game 504, the haptic cue 506a may be generated as an electric pulse that moves synchronous to the movement of the snake around the user 110 on the display screen 502A providing haptically augmented sense of the scene displayed on the display screen 502a. In additional to the electric pulse, a sense of warmness and a gripping pressure may be generated in the route of the movement of the electric pulse, by the haptic feedback generator 222 in the gaming suit 226B. The route is shown by dotted points in the FIG. 5. Thus, a combination of different modalities, such as the differential pressure-based modality, the differential temperature-based modality, the differential electric pulse-based modality, may be used concomitantly to provide extreme realism and enhanced user experience while playing the video game 504 through the haptic feedback interface 108.

Figure 6A:
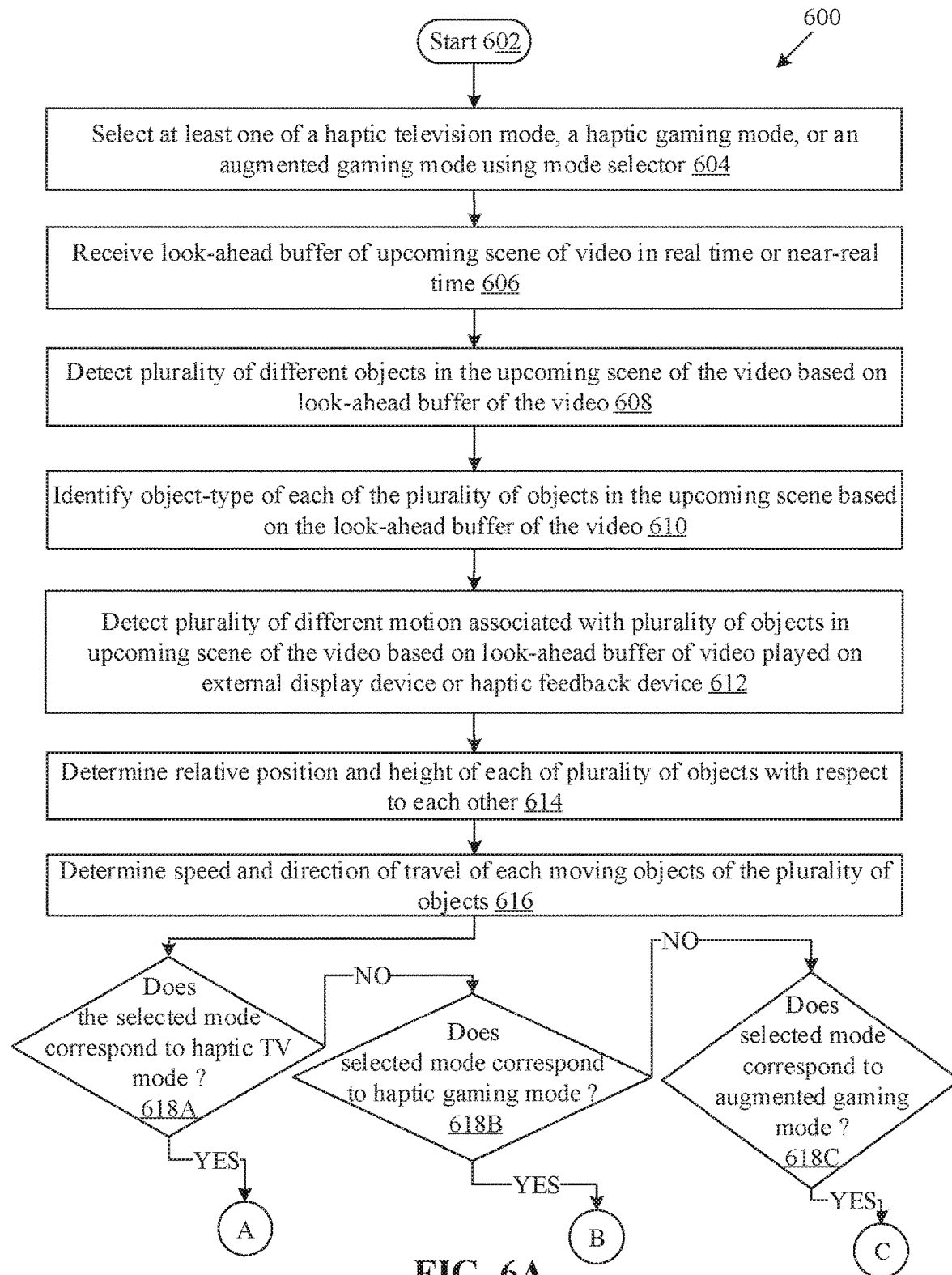
FIGS. 6A, 6B, and 6C collectively, depict a flow chart that illustrates a method for providing haptic sensation, in accordance with an embodiment of the disclosure.
Figure 6B:
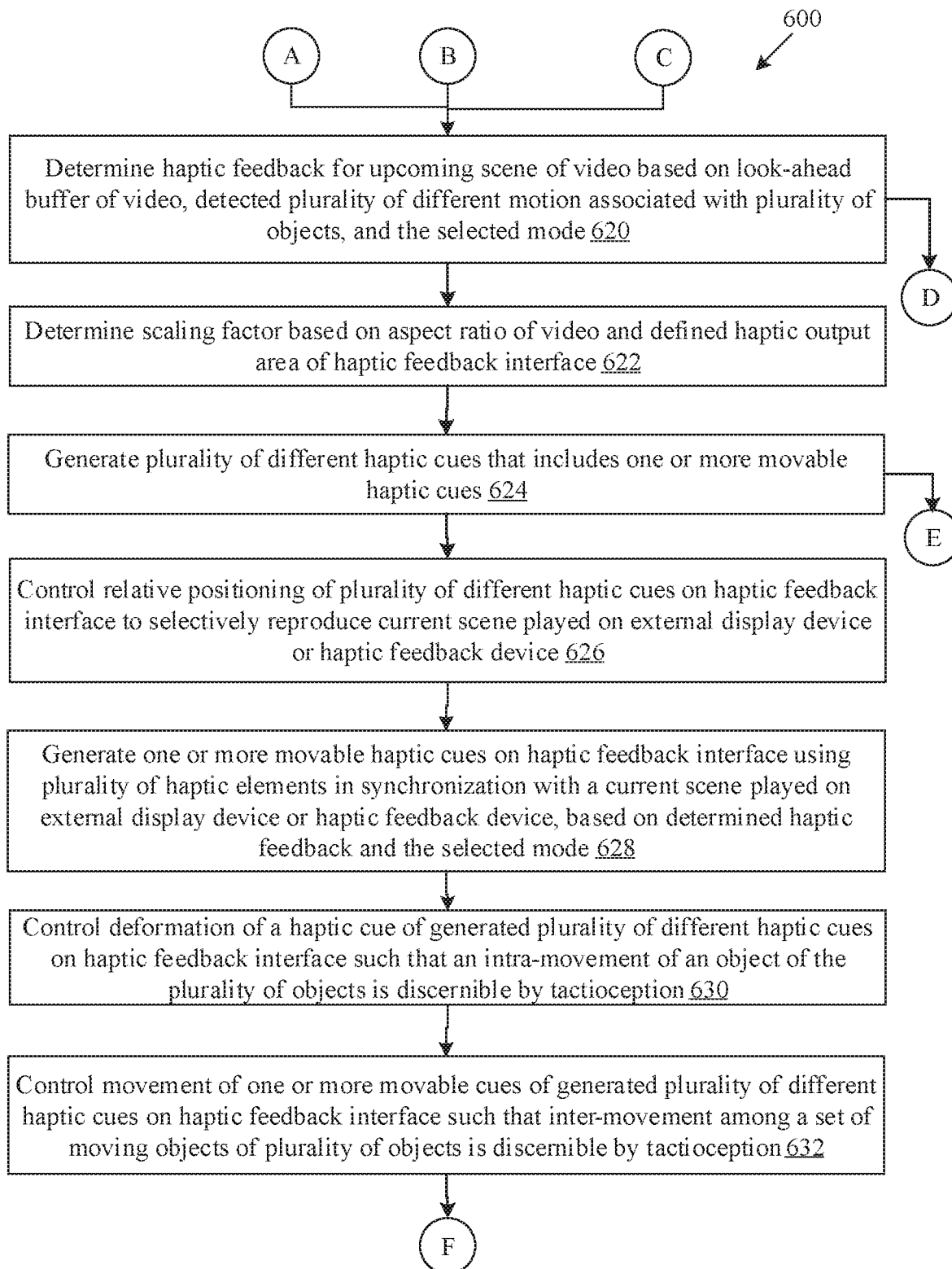
Figure 6C:
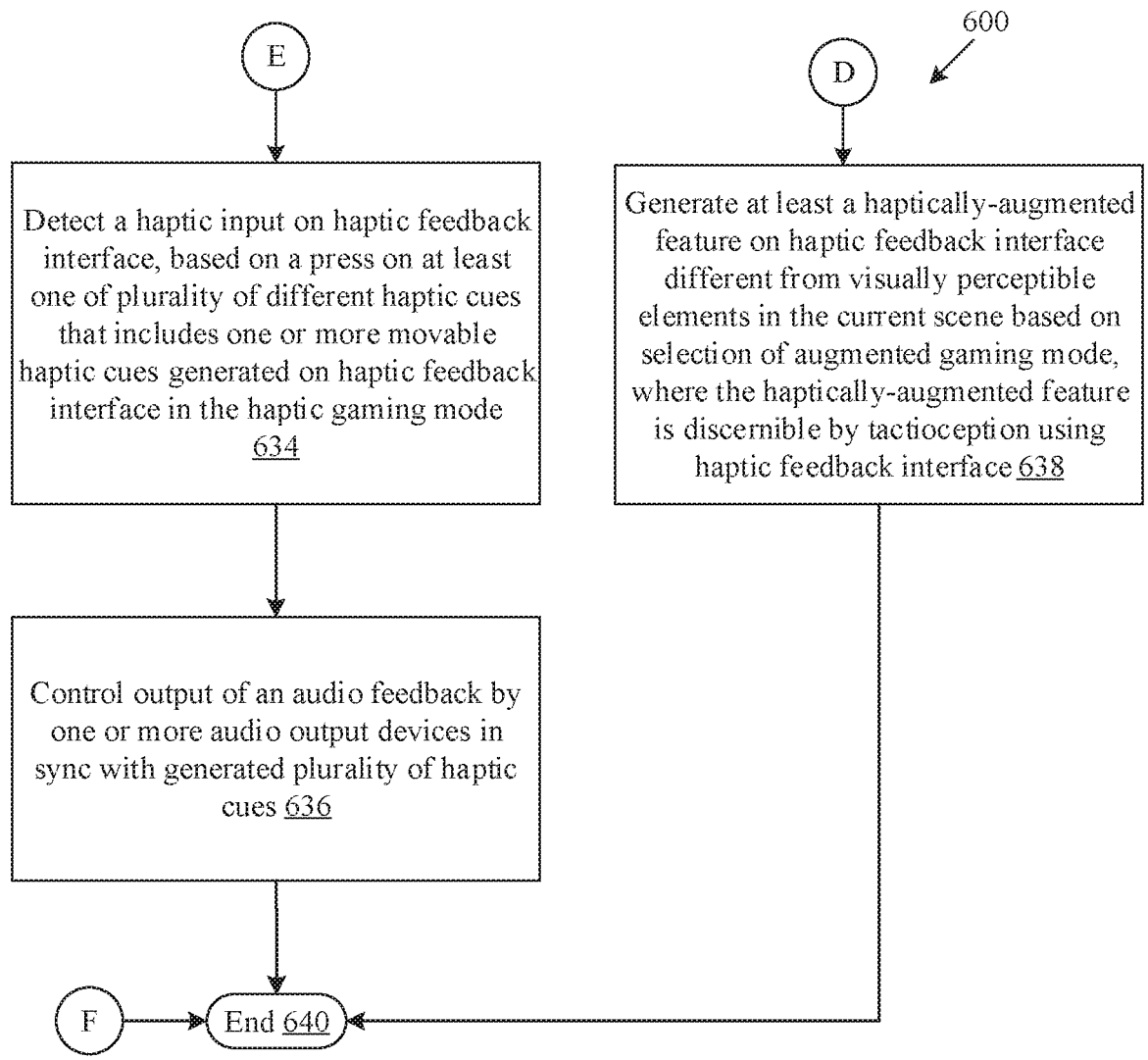

FIGS. 6A, 6B, and 6C collectively, depict a flow chart that illustrates a method for providing haptic sensation, in accordance with an embodiment of the disclosure. FIGS. 6A, 6B, and 6C are described in conjunction with elements from the FIGS. 1, 2A, 2B, 3, 4, and 5. As shown in FIG. 6A, the method of the flow chart 600 starts at 602 and proceeds to 604.

At 604, at least one of a haptic television mode, a haptic gaming mode, or an augmented gaming mode, may be selected using the mode selector 114. The haptic feedback controller 220 may be configured to detect a change or a selection of a mode when the user 110 selects or changes a mode using the mode selector 114.

At 606, a look-ahead buffer of an upcoming scene of the video 112 may be received in real time or near-real time. The network interface 208 may be configured to receive the look-ahead buffer of the upcoming scene of the video 112 in real time or near-real time from the display device 104. Other examples of the video 112 may be the video 304 (such as the TV program or the video game 504).

At 608, a plurality of different objects in the upcoming scene of the video 112 may be detected based on the look-ahead buffer of the video 112. The processing circuitry 210 may be configured to detect the plurality of different objects in the upcoming scene of the video 112.

At 610, an object-type of each of the plurality of objects in the upcoming scene of the video 112 may be identified based the look-ahead buffer of the video 112. The processing circuitry 210 may be configured to identify the object-type of each of the plurality of objects in the upcoming scene of the video 112. Examples of the object-type may include, but are not limited to a human being, an animal, a virtual character, a famous personality, a point-of-interest, a vehicle-type (such as a car, a truck, a bicycle, a two-wheeler, a four-wheeler, and the like), a living object, a non-living object, a moving object, a stationary object, and other objects in the video 112.

At 612, a plurality of different motion associated with the plurality of objects in the upcoming scene of the video 112 may be detected. The processing circuitry 210 may be configured to detect the plurality of different motion associated with the plurality of objects in the upcoming scene of the video 112 based on the look-ahead buffer of the video 112 played on the external display device (such as the display device 104) or the haptic feedback device 102. For example, both intra-motion and inter-motion associated with the plurality of objects may be detected. The intra-motion of an object refers to movement within the object, such as movement of different parts of an object while the object is standing or located at a particular place. The inter-motion refers to movement of objects with respect to each other.

At 614, a relative position and height of each of plurality of objects with respect to each other may be determined. The processing circuitry 210 may be configured to determine the relative position and height of each of plurality of objects with respect to each other.

At 616, speed and a direction of travel of each moving objects of the plurality of objects may be determined. The processing circuitry 210 may be configured to determine the speed and the direction of travel of each moving objects of the plurality of objects.

At 618A, it may be checked whether the selected mode corresponds to the haptic TV mode. In cases where the selected mode is the haptic TV mode, the control passes to 620A, else to 618B. At 618B, it may be checked whether the selected mode corresponds to the haptic gaming mode. In cases where the selected mode is the haptic gaming mode, the control passes to 620B, else to 618C. At 618C, it may be checked whether the selected mode corresponds to the augmented gaming mode. In cases where the selected mode is the augmented gaming mode, the control passes to 620C, else the mode is set to the augmented gaming mode as default mode.

At 620A, a haptic feedback for the upcoming scene of the video 112 may be determined based on the look-ahead buffer of the video 112, the detected plurality of different motion associated with the plurality of objects, and the selected haptic TV mode. The control from 620A may pass to 622. Similarly, at 620B, a haptic feedback for the upcoming scene of the video 112 may be determined based on the look-ahead buffer of the video 112, the detected plurality of different motion associated with the plurality of objects, and the selected haptic gaming mode. The control from 620B may pass to 622. At 620C, a haptic feedback for the upcoming scene of the video 112 may be determined based on the look-ahead buffer of the video 112, the detected plurality of different motion associated with the plurality of objects, and the selected augmented gaming mode. In some embodiments, the control may pass to 636.

At 622, a scaling factor may be determined based on an aspect ratio of the video 112 and defined haptic output area of the haptic feedback interface 108. The processing circuitry 210 may be configured to determine the scaling factor based on the aspect ratio of the video 112 and defined haptic output area of the haptic feedback interface 108.

At 624, a plurality of different haptic cues may be generated on the haptic feedback interface 108 using the plurality of haptic elements 218, based on the determined haptic feedback and the selected mode. In some embodiments, the plurality of different haptic cues may include one or more one or more movable haptic cues. The haptic feedback generator 222 may be configured to generate the one or more movable haptic cues on the haptic feedback interface 108 using the plurality of haptic elements 218 in synchronization with a current scene played on the external display device (such as the display device 104) or the haptic feedback device 102, based on the determined haptic feedback. The plurality of different haptic cues may be generated by a touch-discernible modality. The touch-discernible modality may include at least one of a differential pressure-based modality, a differential temperature-based modality, a differential electric pulse-based modality, a differential raised shape pattern-based modality, or a combination of different touch-discernible modalities.

In accordance with an embodiment, the processing circuitry 210 may be configured to select a first touch-discernible modality from a plurality of touch-discernible modalities to generate a plurality of different haptic cues on the haptic feedback interface 108. The selection of the first touch-discernible modality may be based on learned user interaction information. The learned user interaction information may be determined based on a historical analysis of usage pattern data of the haptic feedback interface 108 by the learning engine provided in the memory 212. In some embodiments, a combination of different touch-discernible modalities may be selected based on the learned user interaction information and a specified user-setting.

In a first example, the selected touch-discernible modality from the plurality of touch-discernible modalities to generate a plurality of different haptic cues on the haptic feedback interface 108, may correspond to a differential pressure-based modality. The plurality of different haptic cues may be generated as multi-level pressure or different amount of pressure on the haptic feedback interface 108 by the haptic feedback generator 222. For example, a first object of the plurality of objects in the video 112 may be discernible by generating a haptic signal through one or more haptic elements of the plurality of haptic elements 218 as a first amount of pressure. This first amount of pressure may be felt by the user 110 when the user 110 touches a specific portion, for example, a first portion, of the haptic feedback interface 108. Similarly, for each position of different objects of the plurality of objects, a different amount of pressure may be generated on the haptic feedback interface 108. Thus, the user 110 may feel different amount of pressure at different points (or portions) on the haptic feedback interface 108. The different amount of pressure enables the user 110 (by touch on the haptic feedback interface 108) to non-visually discern the relative positioning of the plurality of objects in the video 112 (or the video 304 (FIG. 3) or the video game 504 (FIG. 5)). The different amount of pressure may correspond to the plurality of different haptic cues generated as multi-level pressure.

In a second example, the selected touch-discernible modality from the plurality of touch-discernible modalities to generate a plurality of different haptic cues on the haptic feedback interface 108, may correspond to a differential temperature-based modality. In accordance with an embodiment, the plurality of different haptic cues may be generated as different temperatures, for example, different combination of hot and cold temperatures, on the haptic feedback interface 108 by the haptic feedback generator 222. For each position of different objects of the plurality of objects, a different temperature level may be generated on the haptic feedback interface 108 through one or more haptic elements of the plurality of haptic elements 218. The different level of temperature may enable the user 110 (by touch on the haptic feedback interface 108 to non-visually discern the relative positioning of the plurality of objects including the user 110 in a video (such as the video 112, 304, or the video game 504).

In a third example, the selected touch-discernible modality from the plurality of touch-discernible modalities to generate a plurality of different haptic cues on the haptic feedback interface 108, may correspond to a differential electric pulse-based modality. In this case, the plurality of different haptic cues may be generated as different level of electric-pulses on the haptic feedback interface 108 by the haptic feedback generator 222. For each position of different objects of the plurality of objects, a different level of electric-pulse may be generated on the haptic feedback interface 108 through a haptic element of the plurality of haptic elements 218. The different level of electric-pulses may enable the user 110 (by touch sense on the haptic feedback interface 108) to non-visually discern the relative positioning of the plurality of objects in a video (such as the videos 112, 304, or the video game 504). The different amount of electric-pulses may correspond to the plurality of different haptic cues generated as different level of electric-pulses. Further, when an object of the plurality of objects moves in the video, an electric-pulse (e.g. the haptic cue 506a) may also be felt on the haptic feedback interface 122 to be moving as a continuous line from one point of the haptic feedback interface 108 to another point to represent the movement and a direction of movement of the object in the video. The generation of electric-pulse (i.e. a touch-discernible cue) along a certain path on the haptic feedback interface 108 may be synchronized to the actual movement of the object in the video. This allows the user 110 to understand the path of movement of the object via the haptic feedback interface 108. In accordance with an embodiment, the synchronization of the generation of electric-pulse (i.e. a touch-discernible cue) along a certain path on the haptic feedback interface 108 may be controlled based on the determined scaling factor. An example of the generation of electric-pulse along a certain path on the haptic feedback interface 108 has been shown and described in FIG. 5.

In a fourth example, the selected touch-discernible modality from the plurality of touch-discernible modalities to generate a plurality of different haptic cues on the haptic feedback interface 108, may correspond to a differential raised shape pattern-based modality. In this case, the plurality of different haptic cues may be generated as a plurality of protrusions of different shapes that are extended from the surface of the haptic feedback interface 108. The plurality of protrusions of different shape, are shown, for example, in FIGS. 2B, 3, and 4, as the plurality of different haptic cues. Each protrusion may be a raised shape-pattern or a bulge that sticks out from at least one or a group of haptic elements of the plurality of haptic elements 218 of the haptic feedback interface 108. The plurality of protrusions represents the plurality of objects in the video 112. One shape may be assigned to one identified object-type of the plurality of objects of the video 112 to enable the user 110 to discern the object-type when the user 110 touches a protrusion or depression of a defined shape. Thus, similar to the sighted people who use information about the features on the surface of an object, like color, shading, or overall size, and shape, to recognize an object, the people who have lost the sense of sight may also have the capability to identify an object based on a touch on the protrusion of a defined shape, where an association of a particular shape with a particular object-type is learned by brain.

In accordance with an embodiment, the plurality of protrusions generated on the haptic feedback interface 108 enables the user 110 to discern not only the object-type but also a relative positioning of the plurality of objects and movement of one or more of the plurality of objects in the video 112. In accordance with an embodiment, the plurality of protrusions or depressions may be of same shapes. In such a case, although it may be relatively difficult to identify an object-type, however, the relative position and movement (if any) of each of the plurality of objects in the video 112 may be easily discernible by touch on the plurality of protrusions. Further, as the user 110 may hear sound emanated from the display device 104 when the video 112 is played. Hence, the user 110 may correlate the plurality of protrusions with the plurality of sounds to discern an object-type, and an action or movement with respect to the plurality of objects. The haptic feedback generator 222 may be configured to control the extending and the retracting of the plurality of protrusions or depressions by use of the plurality of haptic elements 218.

In accordance with an embodiment, the haptic feedback generator 222 may be configured to control grouping of the plurality of haptic elements 218 during extension or depression to represent a particular shape for a protrusion or depression. In accordance with an embodiment, the protrusion or the depression may be static or may be deformable. The same protrusion may have different meanings based on the deformation. An example of the deformation of the same protrusion (such as the protrusion 230A to protrusions 230B, 230C, 230D, or 230E) is shown and described, for example, in FIG. 2B. In accordance with an embodiment, the plurality of protrusions may be generated by application of different temperatures on different surface area of the haptic feedback interface 108. In such an embodiment, the haptic feedback interface 108 may include a covering on the haptic feedback interface 108. The covering may be a polymer-based layer sensitive to temperature. The plurality of the haptic elements 218 may be arranged as the array of cylindrical tubes below the covering. In cases where, a localized high temperature is generated through one or a group of the haptic elements of the plurality of haptic elements 218, a bulge may appear on the covering of the haptic feedback interface 108. Similarly, different bulge portions may represent the plurality of protrusions. In cases where, a localized low temperature is generated through one or a group of the haptic elements of the plurality of haptic elements 218, the bulge may disappear or subside or a depression may appear on the covering of the haptic feedback interface 108. Similarly, different bulge portions or concavities (or depressions) may represent the plurality of protrusions or depressions. Notwithstanding, the plurality of protrusions and depressions may be generated by various methods, such as by electro-chemical process, electro-mechanical process, without limiting the scope of the disclosure. In accordance with an embodiment, the plurality of different haptic cues may be generated as different level of electric-pulses or a different amount of pressure, such as pain points (or pricking points) that may represent the positioning or movement of the plurality of objects in the video 112 (or the video 304 or the video game 504).

At 626, relative positioning of the plurality of different haptic cues on the haptic feedback interface 108 may be controlled to selectively reproduce the current scene played on the external display device (such as the display device 104) or the haptic feedback device 102. The selective reproduction of the current scene may be done based on a selection of the haptic television mode or the haptic gaming mode. The haptic feedback controller 220 in association with the haptic feedback generator 222 may be configured to control the relative positioning of the plurality of different haptic cues on the haptic feedback interface 108.

At 628, a deformation of a haptic cue of the generated plurality of different haptic cues on the haptic feedback interface 108 may be controlled such that an intra-movement of an object of the plurality of objects may be discernible by tactioception. The haptic feedback controller 220 in association with the haptic feedback generator 222 may be configured to control deformation of one or more haptic cues of the generated plurality of different haptic cues on the haptic feedback interface 108 such that intra-movements of one or more objects of the plurality of objects may be discernible by tactioception.

At 630, movement of the one or more movable cues of the generated plurality of different haptic cues may be controlled on the haptic feedback interface 108 such that an inter-movement among a set of moving objects of the plurality of objects may be discernible by tactioception. The haptic feedback generator 222 may be configured to control the movement of the one or more movable cues of the generated plurality of different haptic cues. In some embodiments, a rate-of-change of movement of the one or more movable haptic cues may be further controlled in accordance with the determined scaling factor. The control may pass to end 638.

At 632, a haptic input may be detected on the haptic feedback interface 108, based on a press or a push on at least one of the generated plurality of different haptic cues that includes the one or more movable haptic cues generated on the haptic feedback interface in the haptic gaming mode. The haptic feedback controller 220 may be configured to detect the haptic input on the haptic feedback interface 108 in the haptic gaming mode.

At 634, output of an audio feedback by one or more audio output devices may be controlled to be in sync with the generated plurality of haptic cues. The control passes to 638.

At 636, at least a haptically-augmented feature may be generated on the haptic feedback interface 108. The haptically-augmented feature may be different from the visually perceptible elements in the current scene. The haptically-augmented feature may be generated based on the selection of the augmented gaming mode. The haptically-augmented feature may be discernible by tactioception using the haptic feedback interface 108. In the augmented gaming mode, the generated one or more movable haptic cues may correspond to a haptically-augmented reproduction of the current scene of the video 112, such as a gaming video. The control passes to end 638 or returns to 604.

In accordance with an exemplary aspect of the disclosure, a system for providing haptic sensation based on video is disclosed. The system may include the haptic feedback device 102 (FIGS. 1, 2A, 2B, 3, 4, and 5), which may comprise the haptic feedback interface 108 (FIG. 1) comprising the plurality of haptic elements 218 (FIG. 2A). The haptic feedback device 102 may further comprise the processing circuitry 210 configured to detect a plurality of different motion associated with a plurality of objects in an upcoming scene of a video (such as the video 112) based on a look-ahead buffer of the video played on an external display device or the haptic feedback device 102. The haptic feedback device 102 may further comprise the haptic feedback controller 220 configured to determine a haptic feedback for the upcoming scene of the video based on the look-ahead buffer of the video and the detected plurality of different motion associated with the plurality of objects. The haptic feedback device 102 may further comprise the haptic feedback generator 222 configured to generate one or more movable haptic cues on the haptic feedback interface 108 using the plurality of haptic elements 218 in synchronization with a current scene played on the external display device or the haptic feedback device 102, based on the determined haptic feedback.

The present disclosure may be realized in hardware, or a combination of hardware and software. The present disclosure may be realized in a centralized fashion, in at least one computer system, or in a distributed fashion, where different elements may be spread across several interconnected computer systems or the special-purpose device. A computer system or other special-purpose apparatus adapted to carry out the methods described herein may be suited. The present disclosure may be realized in hardware that comprises a portion of an integrated circuit that also performs other functions.

The present disclosure may also be embedded in a computer program product, which comprises all the features that enable the implementation of the methods described herein, and which, when loaded in a special-purpose machine or computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. A haptic feedback device for providing haptic sensation, comprising:
   a haptic feedback interface that comprises a plurality of haptic elements;
   processing circuitry configured to detect a plurality of different motion associated with a plurality of objects in a first scene of a video,
   wherein the plurality of different motion are detected based on a look-ahead buffer of the video, and
   wherein the plurality of different motion are associated with at least one of a first movement of a first object of the plurality of objects with respect to a second movement of a second object of the plurality of objects or a third movement within one object of the plurality of objects;
   a haptic feedback controller configured to determine a haptic feedback for the first scene of the video based on the look-ahead buffer of the video and the detected plurality of different motion associated with the plurality of objects; and
   a haptic feedback generator configured to generate at least one movable haptic cue on the haptic feedback interface by synchronization of the plurality of haptic elements with a second scene of the video,
   wherein the at least one movable haptic cue is generated based on an aspect ratio of the video and an area of the haptic feedback interface associated with the determined haptic feedback.

2. The haptic feedback device according to claim 1, wherein the processing circuitry is further configured to detect a plurality of different objects in the first scene of the video, based on the look-ahead buffer of the video.

3. The haptic feedback device according to claim 1, further comprises a mode selector to select at least one of a haptic television mode, a haptic gaming mode, or an augmented gaming mode.

4. The haptic feedback device according to claim 3, wherein the haptic feedback controller is further configured to selectively reproduce the second scene of the video on the haptic feedback interface based on a selection of the haptic television mode.

5. The haptic feedback device according to claim 3, wherein the haptic feedback generator is further configured to:
   generate a plurality of different haptic cues that includes the at least one movable haptic cue; and
   control a relative positioning of the plurality of different haptic cues on the haptic feedback interface to selectively reproduce the second scene played on an external display device or an haptic feedback device based on a selection of the haptic television mode.

6. The haptic feedback device according to claim 5, wherein the plurality of different haptic cues are generated by a touch-discernible modality that includes at least one of a differential pressure-based modality, a differential temperature-based modality, a differential electric pulse-based modality, or a differential raised shape pattern-based modality.

7. The haptic feedback device according to claim 5, wherein the haptic feedback generator is further configured to control deformation of a haptic cue of the generated plurality of different haptic cues on the haptic feedback interface such that an intra-movement of an object of the plurality of objects is discernible by tactioception.

8. The haptic feedback device according to claim 5, wherein the haptic feedback generator is further configured to control movement of the at least one movable haptic cue of the generated plurality of different haptic cues on the haptic feedback interface such that an inter-movement among a set of moving objects of the plurality of objects is discernible by tactioception.

9. The haptic feedback device according to claim 3, wherein the haptic feedback controller is further configured to detect a haptic input on the haptic feedback interface, based on a press on at least one of a plurality of different haptic cues that includes the at least one movable haptic cue generated on the haptic feedback interface in the haptic gaming mode.

10. The haptic feedback device according to claim 3, wherein the haptic feedback generator is further configured to generate at least a haptically-augmented feature on the haptic feedback interface based on a selection of the augmented gaming mode,
wherein the haptically-augmented feature is different from visually perceptible elements in the second scene, and
wherein the haptically-augmented feature is discernible by tactioception.

11. The haptic feedback device according to claim 1, wherein the generated at least one movable haptic cue corresponds to a haptically-augmented reproduction of the second scene of the video.

12. The haptic feedback device according to claim 1, further comprising a network interface to receive the look-ahead buffer of the first scene of the video in real time or near-real time from an external display device, wherein the external display device is communicatively coupled to the haptic feedback device.

13. The haptic feedback device according to claim 1, wherein the processing circuitry is further configured to identify an object-type of each of the plurality of objects in the first scene based on the look-ahead buffer of the video.

14. The haptic feedback device according to claim 1, wherein the processing circuitry is further configured to determine a scaling factor based on the aspect ratio of the video and the area of the haptic feedback interface, wherein a rate-of-change of movement of the at least one movable haptic cue is controlled based on the scaling factor.

15. The haptic feedback device according to claim 1, wherein each of the at least one movable haptic cue is generated as a protrusion of a defined shape-pattern extending from the haptic feedback interface, wherein at least one motion from the detected plurality of different motion associated with the plurality of objects in the first scene of the video is discernible based on a movement of the at least one movable haptic cue on the haptic feedback interface.

16. A method for providing haptic sensation, comprising:
in an haptic feedback device that comprises at least a processing circuitry, a haptic feedback controller, a haptic feedback generator, and a haptic feedback interface that includes a plurality of haptic elements:
detecting, by the processing circuitry, a plurality of different motion associated with a plurality of objects in an first scene of a video,
wherein the plurality of different motion are detected based on a look-ahead buffer of the video, and
wherein the plurality of different motion are associated with at least one of a first movement of a first object of the plurality of objects with respect to a second movement of a second object of the plurality of objects or a third movement within one object of the plurality of objects;
determining, by the haptic feedback controller, a haptic feedback for the first scene of the video based on the look-ahead buffer of the video and the detected plurality of different motion associated with the plurality of objects; and
generating, by the haptic feedback generator, at least one movable haptic cue on the haptic feedback interface by synchronization of the plurality of haptic elements with a second scene of the video,
wherein the at least one movable haptic cue is generated based on an aspect ratio of the video and an area of the haptic feedback interface associated with the determined haptic feedback.

17. The method according to claim 16, further comprising identifying, by the processing circuitry, a plurality of different objects in the first scene of the video based on the look-ahead buffer of the video.

18. The method according to claim 16, further comprising selecting at least one of a haptic television mode, a haptic gaming mode, or an augmented gaming mode.

19. The method according to claim 18, further comprising selectively reproducing, by the haptic feedback controller, the second scene on the haptic feedback interface based on selection of the haptic television mode.

20. The method according to claim 16, further comprising controlling, by the haptic feedback generator, deformation of a haptic cue of a plurality of different haptic cues generated on the haptic feedback interface such that an intra-movement of an object of the plurality of objects is discernible by tactioception, wherein the plurality of different haptic cues includes the at least one movable haptic cue.

* * * * *